US011671183B2

(12) United States Patent
Macrae

(10) Patent No.: US 11,671,183 B2
(45) Date of Patent: Jun. 6, 2023

(54) WIRELESS CONTENT DISTRIBUTION

(71) Applicant: Bluebox Aviation Systems Ltd, Dunfermline (GB)

(72) Inventor: James Macrae, Dunfermline (GB)

(73) Assignee: BLUEBOX AVIATION SYSTEMS LTD, Dunfermline (GB)

( * ) Notice: Subject to any disclaimer, the term of this patent is extended or adjusted under 35 U.S.C. 154(b) by 0 days.

(21) Appl. No.: 17/441,469

(22) PCT Filed: Mar. 26, 2020

(86) PCT No.: PCT/EP2020/058610
§ 371 (c)(1),
(2) Date: Sep. 21, 2021

(87) PCT Pub. No.: WO2020/193724
PCT Pub. Date: Oct. 1, 2020

(65) Prior Publication Data
US 2022/0158744 A1    May 19, 2022

(30) Foreign Application Priority Data
Mar. 26, 2019 (GB) .................... 1904164

(51) Int. Cl.
*H04J 14/00* (2006.01)
*H04B 10/80* (2013.01)
(Continued)

(52) U.S. Cl.
CPC ....... *H04B 10/802* (2013.01); *H04B 10/2587* (2013.01); *H04B 10/25759* (2013.01); *H04B 10/64* (2013.01)

(58) Field of Classification Search
CPC .......... H04B 10/2575; H04B 10/25753; H04B 10/40; H04B 10/27; H04B 10/25759;
(Continued)

(56) References Cited

U.S. PATENT DOCUMENTS 8,170,535 B1    5/2012 Lopes
10,644,785 B2*  5/2020 Hansen ............ B64D 11/00155
(Continued)

FOREIGN PATENT DOCUMENTS

EP    0569225 A2    11/1993
EP    0570198 A2    11/1993
(Continued)

OTHER PUBLICATIONS

Written Opinion issued in PCT/EP2020/058610 dated Sep. 7, 2020.
Search Report issued in GB1904164.9 dated Nov. 27, 2019.
Search Report issued in GB1904164.9 dated Mar. 16, 2020.

*Primary Examiner* — Hanh Phan
(74) *Attorney, Agent, or Firm* — Snell & Wilmer L.L.P.

(57) ABSTRACT

An optical isolator system comprises an electrical-to-optical converter apparatus for receiving an input electrical signal from a system of an aircraft and converting the input electrical signal into an optical signal which is representative of the input electrical signal. The optical isolator system further comprises an optical-to-electrical converter apparatus for receiving the optical signal from the electrical-to-optical converter apparatus, for converting the received optical signal into an output electrical signal which is representative of the received optical signal, and for transmitting the output electrical signal to a portable server for the wireless distribution of content such as visual content, web content, video content, audio content, games, services, information and/or advertising content to clients in the aircraft. Associated methods are also described.

14 Claims, 17 Drawing Sheets

(51) Int. Cl.
  *H04B 10/2575* (2013.01)
  *H04B 10/2587* (2013.01)
  *H04B 10/64* (2013.01)

(58) Field of Classification Search
  CPC ............... H04B 10/2587; H04B 10/64; H04B 10/25752; H04N 21/214; H04N 21/2146; H04W 4/06; B64D 11/00155
  USPC .... 398/66, 67, 68, 69, 70, 71, 72, 135, 136, 398/137, 138, 164, 115, 128, 130, 127, 398/159, 33, 100, 58; 725/76, 74, 75, 71, 725/72, 73, 77
  See application file for complete search history.

(56) References Cited

U.S. PATENT DOCUMENTS 10,993,084 B2 * 4/2021 Macrae .................. H04W 4/38
2009/0202241 A1 * 8/2009 Yu ....................... H04J 14/0252
  398/58
2011/0065303 A1 3/2011 Petrisor
2014/0137164 A1 5/2014 Yang
2014/0282747 A1 * 9/2014 Richman ............... H04W 76/15
  725/62
2016/0134920 A1 * 5/2016 Bleacher .......... H04N 21/41422
  725/76
2017/0310543 A1 * 10/2017 Greig ............... B64D 11/00151
2018/0027037 A1 1/2018 Watson

FOREIGN PATENT DOCUMENTS

| | | |
|---|---|---|
| EP | 3407501 A1 | 11/2018 |
| EP | 3273659 A1 | 5/2019 |
| WO | 199858398 A1 | 12/1998 |
| WO | 2005057835 A2 | 6/2005 |
| WO | 2009100352 A1 | 8/2009 |
| WO | 2011020071 A1 | 2/2011 |
| WO | 2018178704 A1 | 10/2018 |

* cited by examiner

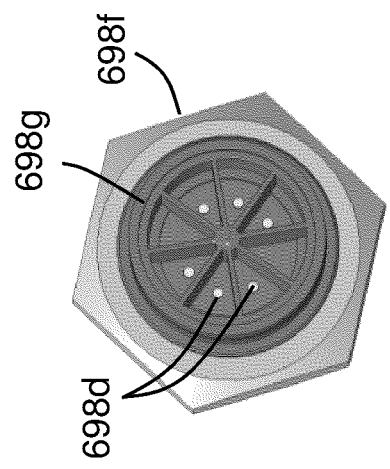
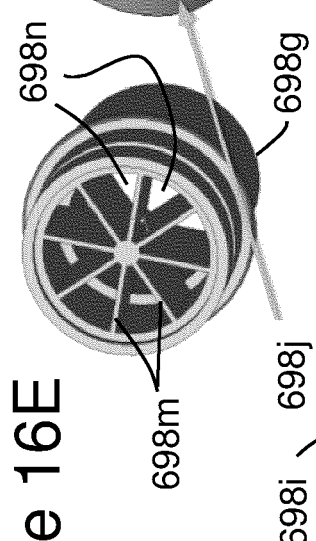
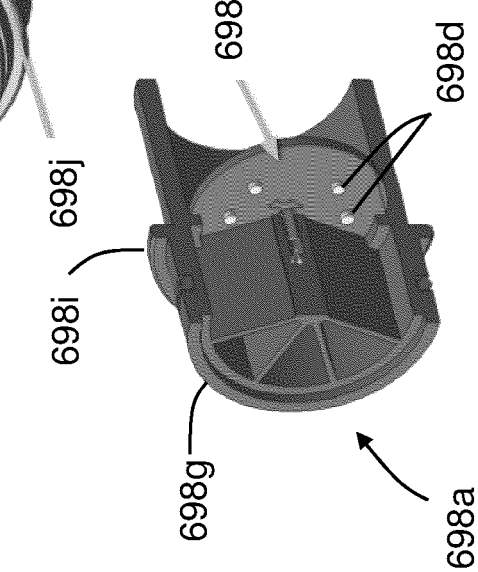
Figure 16A
Figure 16B
Figure 16C
Figure 16D
Figure 16E

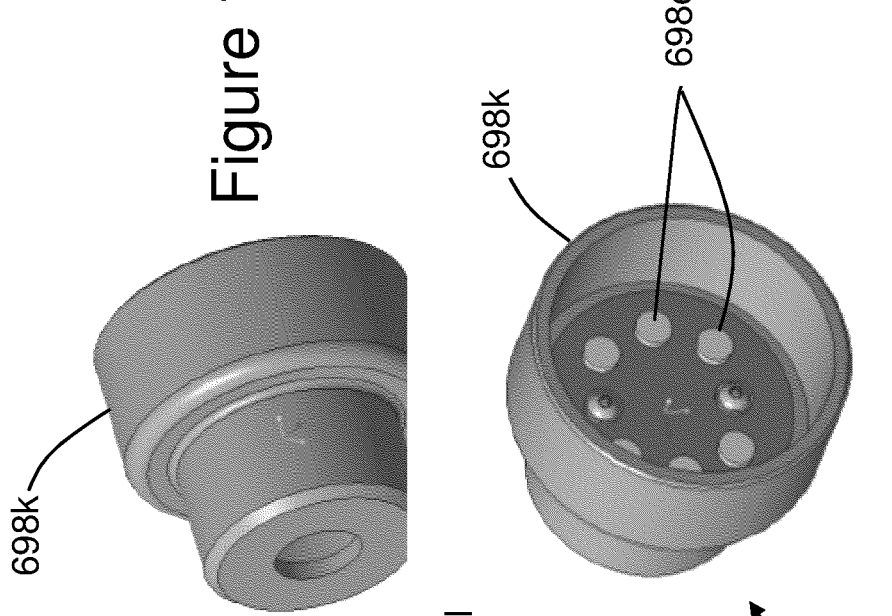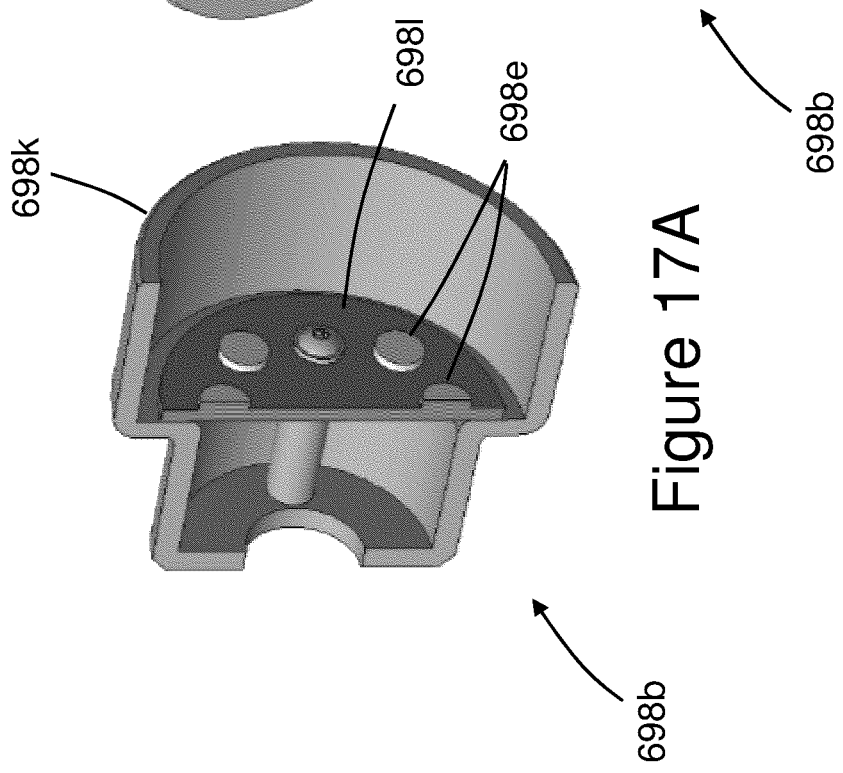

WIRELESS CONTENT DISTRIBUTION

CROSS-REFERENCE TO RELATED APPLICATIONS

This application is a national stage application of PCT/EP2020/058610, filed on Mar. 26, 2020, entitled "WIRELESS CONTENT DISTRIBUTION," which claims priority to UK Application No. 1904164.9, filed on Mar. 26, 2019, both of which are hereby incorporated by reference in their entirety for all purposes.

FIELD

The present invention relates to the wireless distribution of content such as visual content, web content, video content, audio content, games, services, information and/or advertising content to clients in a local area and, in particular though not exclusively, to a wireless content distribution system for providing content to passengers in a vehicle such as an aircraft, a portable server for wirelessly distributing content to a plurality of clients in the aircraft, an electrical-to-optical converter apparatus, an optical-to-electrical converter apparatus and an optical isolator system for use in electrically isolating the portable server from a system of the aircraft and associated methods.

BACKGROUND

The provision of content distribution systems that provide in-flight entertainment to passengers have become increasingly important to airlines, as the choice of content available to passengers and the performance and reliability of such systems has a significant impact on the passenger's enjoyment of a flight and consequently has become an important factor for passengers in selecting an airline or flight.

Known aircraft content distribution systems comprise individual display units at each seat linked by wired network connections (for example via Ethernet connections) to a central server that stores all content available to passengers. An application running at the server provides menus of available content to each user, from which the user is able to select a piece of content to play. The selected content is then streamed in real time from the server to the user's display unit. Such known systems require powerful servers, and high bandwidth network connections that are able to distribute different content to every passenger on the aircraft simultaneously. The requirement for powerful servers and high bandwidth wired connections to each seat add significantly to the weight of the aircraft, which has significant cost and operational implications. Furthermore, as such systems form an integral part of the aircraft they must comply with high safety certification requirements.

Alternative known aircraft content distribution systems stream content from the server to the display devices via wireless rather than wired network connections. However, wireless connections within aircraft can be unreliable due to the geometry of the aircraft, and signal reflection and cancellation effects within the confined space of the aircraft cabin. In order to address such issues, the power of the wireless transmissions may be increased, but it is difficult to scale such systems up for use in larger aircraft without power requirements becoming unfeasibly large. Furthermore, such known wireless systems are usually integrated with other aircraft systems, for example passenger service systems, and again must comply with high safety certification requirements One reason for integrating known aircraft content distribution systems with other aircraft systems, for example passenger service systems, and also for using a central server to stream content in real time, is to ensure that the cabin staff can control the streaming of content to the passengers, and can halt or pause the playing of content for instance in an emergency or to enable delivery messages over an intercom system. Installation and maintenance of such systems can be complex and expensive.

SUMMARY

It should be understood that any one or more of the features of the following aspects or embodiments of the present invention may apply alone or in any combination in relation to any of the other following aspects or embodiments of the present invention.

According to an aspect or an embodiment of the present invention there is provided a portable server for wirelessly distributing content to a plurality of clients in an aircraft, comprising:

a memory or data store for storing content;

a wireless content transceiver for wireless communication with one or more of the clients located within the aircraft for wireless distribution of at least some of the stored content from the portable server to one or more of the clients; and a wireless communication device which is configured to operate independently of the wireless content transceiver and which is configured to wirelessly receive information from one or more further wireless communication devices located within, and mounted to, the aircraft.

The portable server may be configured to determine, for example, decode, portable server location data from the signal detected by the wireless communication device.

The portable server may be configured to store the determined portable server location data in the memory or data store of the portable server.

The portable server may comprise a processing resource.

The processing resource may be configured to determine the portable server location data from the signal detected by the wireless communication device.

The processing resource may be configured to store the portable server location data in the memory or data store.

The portable server location data may comprise an identifier for the aircraft such as a unique aircraft number or aircraft code.

The portable server may be configured to receive or monitor broadcast aircraft location information from the aircraft within which the portable server is located.

The portable server may be capable of receiving broadcast aircraft location information from aircraft other than the aircraft within which the portable server is located.

The portable server may comprise a radio receiver configured to receive or monitor broadcast aircraft location information from the aircraft within which the portable server is located.

The portable server may be configured, for example the processing resource of the portable server may be configured, to process the broadcast aircraft location information and to generate, based on the processed broadcast aircraft location information, aircraft flight information for display on a moving map at the one or more clients.

The portable server may be configured, for example the processing resource of the portable server may be configured, to use the aircraft identifier to distinguish between broadcast aircraft location information received from the aircraft within which the portable server is located and broadcast aircraft location information received from one or more other aircraft.

The broadcast aircraft location information may comprise automatic dependent surveillance broadcast (ADSB) information.

The portable server location data may comprise an identifier for an airline with which the aircraft is associated such as a unique airline number or airline code.

The portable server location data may comprise an identifier for each of the one or more further wireless communication devices located within the aircraft such as a unique further wireless communication device number or code for each of the one or more further wireless communication devices located within the aircraft.

The portable server location data may comprise a transmitted Transmit Power (TxPwr) setting of each of the one or more further wireless communication devices located within the aircraft.

The portable server may be configured, for example the processing resource of the portable server may be configured, to determine a distance of the wireless communication device from each of the one or more further wireless communication devices located within the aircraft.

The portable server may be configured, for example the processing resource of the portable server may be configured, to determine a strength of a signal received from each of the one or more further wireless communication devices located within the aircraft.

The portable server may be configured, for example the processing resource of the portable server may be configured, to use the received signal strength (RSS) from each of the one or more further wireless communication devices located within the aircraft and the transmitted Transmit Power (TxPwr) setting of each of the one or more further wireless communication devices located within the aircraft to determine a distance of the portable server from each of the one or more further wireless communication devices located within the aircraft.

The portable server may be configured, for example the processing resource of the portable server may be configured, to use the determined distance of the portable server from each of the one or more further wireless communication devices located within the aircraft to determine a location of the portable server relative to each of the one or more further wireless communication devices located within the aircraft.

The portable server may be configured, for example the processing resource of the portable server may be configured, to use the determined distance of the portable server from each of the one or more further wireless communication devices located within the aircraft and a known location of each of the one or more further wireless communication devices located within the aircraft to determine a location of the portable server within the aircraft.

The portable server may be configured, for example the processing resource of the portable server may be configured, to store the determined location of the portable server within the aircraft in the memory or data store.

The wireless communication device may be configured to wirelessly receive the information from each of the one or more further wireless communication devices located within, and mounted to, the aircraft at a data rate which is lower than a data rate at which the wireless content transceiver is configured to wirelessly distribute at least some of the stored content to one or more of the clients.

The wireless communication device may be configured to consume less power than the wireless content transceiver.

The wireless communication device may comprise a wireless receiver and the one or more of the further wireless communication devices may comprise one or more wireless transmitters.

The wireless communication device may not be capable of, or suitable for, receiving information wirelessly from one or more further wireless communication devices located outside the aircraft.

The wireless communication device may be configured to distinguish between information received wirelessly from the one or more further wireless communication devices located within the aircraft and information received wirelessly from one or more further wireless communication devices located outside the aircraft.

The wireless communication device and the wireless content transceiver may be configured to use different wireless communication standards or protocols.

The wireless content transceiver may comprise a Wi-Fi access point.

The wireless communication device may be configured to use a wireless communication standard or protocol which is capable of, or suitable for, wireless communication between the wireless communication device and the one or more further wireless communication devices located within the aircraft, but which is not capable of, or suitable for, wireless communication between the wireless communication device and one or more further wireless communication devices located outside the aircraft.

The wireless communication device may be configured to use a Bluetooth wireless communication standard or protocol.

The wireless communication device may comprise a Bluetooth receiver and each of the one or more further wireless communication devices may comprise a Bluetooth transmitter.

The wireless communication device may be configured to use an RFID wireless communication standard or protocol.

The wireless communication device may comprise an RFID reader or scanner and each of the one or more further wireless communication devices may comprise an RFID tag.

Each RFID tag may comprise an active RFID tag or a passive RFID tag.

Each RFID tag may comprise a short range RFID tag or a long range (UHF) RFID tag.

The wireless communication device may be configured to detect a signal received from each of the one or more further wireless communication devices located within the aircraft based on an expected range of transmission of the one or more further wireless communication devices located within the aircraft.

The portable server may be installed in the aircraft at an installation point, for example the portable server may be installed in an overhead bin or in a galley stowage location. The portable server may be mounted to a bulkhead, or at any suitable location in a cabin of the aircraft.

At least one of the one or more further wireless communication devices located within the aircraft may be installed adjacent to, close to, or next to the portable server.

The portable server may be configured to repeatedly monitor and/or scan for transmissions from each of the one or more further wireless communication devices located within the aircraft.

The portable server may be configured to repeatedly monitor and/or scan for each of the one or more further wireless communication devices located within the aircraft.

The wireless communication device may be configured to receive and detect a signal from each of the one or more further wireless communication devices located within the aircraft.

The wireless communication device may comprise an antenna.

The wireless communication device of the portable server may comprise a wireless transmitter or a wireless transceiver and the one or more of the further wireless communication devices may comprise one or more wireless receivers or one or more wireless transceivers.

The wireless communication device of the portable server may be configured to broadcast information wirelessly to one or more wireless communication devices of one or more other portable servers located within the aircraft to thereby advertise the presence of the portable server to the one or more other portable servers located within the aircraft.

The wireless communication device of the portable server may be configured to receive information wirelessly from one or more wireless communication devices of one or more other portable servers located within the aircraft. The portable server may be configured to determine the number of other portable servers located within the aircraft from the information received wirelessly from the one or more wireless communication devices of the one or more other portable servers located within the aircraft, and to compare the determined number of other portable servers located within the aircraft with a known or expected number of other portable servers located within the aircraft. The portable server may be configured to emit a warning indication or signal and/or to record a warning message if the number of other portable servers located within the aircraft determined from the information received wirelessly from the one or more wireless communication devices of the one or more other portable servers located within the aircraft does not match the known or expected number of other portable servers located within the aircraft.

The known or expected number of other portable servers located within the aircraft may be determined independently from the information received wirelessly by the wireless communication device of the portable server from the one or more wireless communication devices of the one or more other portable servers located within the aircraft. The known or expected number of other portable servers located within the aircraft may be determined by recording the number of other portable servers located within the aircraft on installation of the other portable servers within the aircraft.

The wireless transmitter or the wireless transceiver of the portable server may be configured to broadcast information wirelessly to one or more wireless transceivers of one or more other portable servers located within the aircraft to thereby advertise the presence of the portable server to the one or more other portable servers located within the aircraft.

The wireless receiver or the wireless transceiver of the portable server may be configured to receive information wirelessly from one or more wireless transceivers of one or more other portable servers located within the aircraft, and the portable server may be configured to determine the known or expected number of other portable servers located within the aircraft from the information received wirelessly from the one or more wireless transceivers of the one or more other portable servers located within the aircraft.

According to an aspect or an embodiment of the present invention there is provided a portable server system for wirelessly distributing content to a plurality of clients in an aircraft, the portable server system comprising:

a portable server as described above; and
the one or more further wireless communication devices located within, and mounted to, the aircraft.

The portable server and a corresponding one of the one or more further wireless communication devices may have a pre-determined spatial relationship relative to one another.

The wireless communication device and the corresponding one of the one or more further wireless communication devices located within the aircraft may be configured so that the wireless communication device is required to be correctly oriented and located in sufficient proximity to the corresponding one of the one or more further wireless communication devices for transmission of a signal from the corresponding one of the one or more further wireless communication devices to the wireless communication device and for the wireless communication device to detect portable server location data carried by the transmitted signal.

The portable server system may comprise a mounting arrangement or housing for mounting the portable server and the corresponding one of the one or more further wireless communication devices to the aircraft such that the portable server and the corresponding one of the one or more further wireless communication devices have a pre-determined spatial relationship relative to one another.

The mounting arrangement or housing may contain the corresponding one of the one or more further wireless communication devices.

The mounting arrangement or housing may be configured to prevent unauthorised removal of the corresponding one of the one or more further wireless communication devices from the mounting arrangement or housing.

The mounting arrangement or housing may comprise an anti-tamper mechanism which is configured to prevent unauthorised removal of the corresponding one of the one or more further wireless communication devices from the mounting arrangement or housing.

The anti-tamper mechanism may comprise a lock which is configured to be opened by a key or a dedicated tool.

According to an aspect or an embodiment of the present invention there is provided a portable server system for wirelessly distributing content to a plurality of clients in an aircraft, the portable server system comprising:

a plurality of portable servers, wherein each portable server is configured as described above; and a plurality of further wireless communication devices located within, and mounted to, the aircraft, each further wireless communication device corresponding to one of the portable servers, wherein the wireless communication device of each portable server is configured to operate independently of the wireless content transceiver of the same portable server and is configured to wirelessly receive information from each of the one or more further wireless communication devices located within, and mounted to, the aircraft.

The wireless communication device of each portable server may be configured to wirelessly receive information from each of the one or more further wireless communication devices located within, and mounted to, the aircraft at a data rate which is lower than a data rate at which the wireless content transceiver of the same portable server is configured to wirelessly distribute at least some of the stored content to one or more of the clients.

The wireless communication device of each portable server may be configured to consume less power than the wireless content transceiver of the same portable server.

Each portable server and the corresponding one of the further wireless communication devices may have a pre-determined spatial relationship relative to one another.

The portable server system may comprise a mounting arrangement or housing for mounting a portable server and a corresponding one of the further wireless communication devices to the aircraft such that the portable server and the corresponding one of the further wireless communication devices have a pre-determined spatial relationship relative to one another.

The mounting arrangement or housing may contain the corresponding one of the further wireless communication devices.

The mounting arrangement or housing may be configured to prevent unauthorised removal of the corresponding one of the further wireless communication devices from the mounting arrangement or housing.

The mounting arrangement or housing may comprise an anti-tamper mechanism which is configured to prevent unauthorised removal of the corresponding one of the further wireless communication devices from the mounting arrangement or housing.

The anti-tamper mechanism may comprise a lock which is configured to be opened by a key or a dedicated tool.

According to an aspect or an embodiment of the present invention there is provided a method for wirelessly distributing content to a plurality of clients in an aircraft, comprising:

wirelessly communicating content stored in a memory or data store of a portable server from a wireless content transceiver of the portable server to one or more of the clients within the aircraft; and wirelessly communicating information from one or more further wireless communication devices located within, and mounted to, the aircraft to a wireless communication device of the portable server, wherein the wireless communication device is configured to operate independently of the wireless content transceiver.

The wireless communication device may be configured to wirelessly receive information from each of the one or more further wireless communication devices located within, and mounted to, the aircraft at a data rate which is lower than a data rate at which the wireless content transceiver is configured to wirelessly distribute at least some of the stored content to one or more of the clients.

The wireless communication device may be configured to consume less power than the wireless content transceiver.

The wireless communication device may comprise a wireless receiver and the one or more of the further wireless communication devices may comprise one or more wireless transmitters.

The wireless communication device may not be capable of, or suitable for, receiving information wirelessly from one or more further wireless communication devices located outside the aircraft.

The wireless communication device may be configured to distinguish between information received wirelessly from the one or more further wireless communication devices located within the aircraft and information received wirelessly from one or more further wireless communication devices located outside the aircraft.

The wireless communication device and the wireless content transceiver may be configured to use different wireless communication standards or protocols.

The wireless content transceiver may comprise a Wi-Fi access point.

The wireless communication device may be configured to use a wireless communication standard or protocol which is capable of, or suitable for, wireless communication between the wireless communication device and the one or more further wireless communication devices located within the aircraft, but which is not capable of, or suitable for, wireless communication between the wireless communication device and one or more further wireless communication devices located outside the aircraft.

The wireless communication device may be configured to use a Bluetooth wireless communication standard or protocol.

The wireless communication device may comprise a Bluetooth receiver and each of the one or more further wireless communication devices may comprise a Bluetooth transmitter.

The wireless communication device may be configured to use an RFID wireless communication standard or protocol.

The wireless communication device may comprise an RFID reader or scanner and each of the one or more further wireless communication devices may comprise an RFID tag.

The RFID tag may comprise an active RFID tag or a passive RFID tag.

The RFID tag may be short range RFID tag or a long range (UHF) RFID tag.

The steps of the method may be performed sequentially or may at least partially overlap. The steps of the method may be performed in any order.

Each client may comprise a computing device of any kind. Each client may have or run an operating system of any kind e.g. Apple iOS, Apple Mac OS, Windows, Linux or the like. Each client may comprise a mobile device associated with and/or operated by a user. For example, each mobile device may comprise a smartphone, a tablet and/or a laptop. Each mobile device may comprise an Apple iOS device, an Android device, an Apple MacBook, a laptop running Windows or Linux, and/or a device with an HTML5 compliant browser. Each client may comprise a personal computer (PC). Each client may include software such as an app or an internet browser to permit the user to communicate with, and select content stored on, the portable server and to permit the user to view and/or listen to the content. Each user may download the software from the internet to the corresponding client in advance of entering the aircraft in which the system is installed. Alternatively, the software may be provided with an operating system of the client or bundled with OEM software.

The portable server does not require any dedicated or fixed client devices to be provided or to be permanently installed in the aircraft to permit each user to select, view and/or listen to content. The portable server is designed for use in a Bring Your Own Device (BYOD) model. The BYOD model allows users to use their own compatible mobile devices to access the portable server: iOS, Android, PC or Mac. Users' own mobile devices are allowed to join a network provided by the portable server so that each user may browse, view and/or listen to content. The portable server may define a portable system for wirelessly distributing content to the plurality of clients in the aircraft.

The portable server and at least one other portable server may together define a portable server system for wirelessly distributing content to the plurality of clients in the aircraft. Each portable server may be configured for wireless communication with one or more corresponding clients so that the portable system may distribute content to the plurality of clients in the aircraft.

The portable server system may be configured for occasional connection to the internet.

The portable server system may be configured to deliver content to the plurality of clients when the portable server system has no connection, or no access, to the internet. The portable server system may be configured to allow the content to be updated and/or changed when the portable server system has a connection, or access, to the internet.

The portable server system may be readily installed in the aircraft by simply carrying the portable servers into the aircraft, arranging or mounting the portable servers around the aircraft such that each portable server is located within communication range of at least one of the other portable servers and such that the wireless communication device of each portable server is located within the communication range of the one or more further wireless communication devices, and powering-up the portable servers. The portable server system may comprise a mounting arrangement or housing for each portable server, wherein the mounting arrangement or housing is configured to locate the portable server and one or more corresponding further wireless communication devices relative to one another. Each mounting arrangement or housing may provide power to a corresponding one of the portable servers. As such, the portable server system may be used to establish a portable or "walk-on" wireless network in the aircraft and the portable server system may be operated to provide walk-on wireless in-flight entertainment, services and/or information.

The content may comprise visual content such as video content and/or web content. The content may comprise audio content. The content may comprise entertainment content. The content may include Movie and TV video, music, audiobooks, eMagazines and newspapers, and games such as HTML5 games. The content may comprise information relating to at least one of shopping services, maps such as moving maps, flights, destination information, airport information, and food and drinks orders. The content may comprise advertising content.

According to an aspect or an embodiment of the present invention which may be provided independently of any of the foregoing aspects or embodiments of the present invention there is provided an electrical-to-optical converter apparatus for use in electrically isolating a portable server from a system of an aircraft, comprising:

an electrical input signal terminal for connection to an electrical output signal terminal of a system of the aircraft; and an electrical-to-optical converter device connected electrically to the electrical input signal terminal, wherein the electrical-to-optical converter device is configured so as to convert an input electrical signal received at the electrical input signal terminal into an optical signal which is representative of the input electrical signal.

The electrical-to-optical converter apparatus may comprise:

a plurality of electrical input signal terminals, each electrical input signal terminal being configured for connection to a corresponding electrical output signal terminal of the system of the aircraft; and a plurality of electrical-to-optical converter devices, each electrical-to-optical converter device being connected electrically to a corresponding electrical input signal terminal, wherein each electrical-to-optical converter device is configured so as to convert a corresponding input electrical signal received by the corresponding electrical input signal terminal into a corresponding optical signal which is representative of the corresponding electrical signal.

The electrical-to-optical converter apparatus may comprise an electrical input power terminal for connection to an electrical output power terminal of the system of the aircraft, wherein the electrical input power terminal is electrically isolated from each electrical input signal terminal and wherein the electrical input power terminal is connected electrically to each electrical-to-optical converter device for the provision of electrical power thereto.

The electrical-to-optical converter apparatus may comprise a power status electrical-to-optical converter device, wherein the electrical input power terminal is connected electrically to the power status electrical-to-optical converter device so that the power status electrical-to-optical converter device provides an optical power status signal indicating whether the electrical input power terminal receives electrical power.

Each electrical-to-optical converter device may comprise an optoelectronic optical source.

Each electrical-to-optical converter device may comprise a LED.

Each electrical-to-optical converter device may be configured to emit an optical signal which is distinguishable from the optical signal emitted by each of the other electrical-to-optical converter devices.

Each electrical-to-optical converter device may be configured to emit an optical signal having a colour or wavelength which is distinguishable from the colour or wavelength of the optical signal emitted by each of the other electrical-to-optical converter devices.

Each electrical-to-optical converter device may be configured for operation at a rate of up to 1 bit/s, 10 bit/s, 100 bit/s, 1 Kbit/s, or 10 Kbit/s.

According to an aspect or an embodiment of the present invention which may be provided independently of any of the foregoing aspects or embodiments of the present invention there is provided an optical-to-electrical converter apparatus for use in electrically isolating a portable server from a system of an aircraft, the optical-to-electrical converter apparatus comprising:

an electrical output signal terminal for connection to a portable server for use in the aircraft; and an optical-to-electrical converter device connected electrically to the electrical output signal terminal, wherein the optical-to-electrical converter device is configured so as to convert a received optical signal into an output electrical signal which is representative of the optical signal and to transmit the output electrical signal to the electrical output signal terminal.

The optical-to-electrical converter apparatus may comprise:

a plurality of electrical output signal terminals, each electrical output signal terminal being configured for connection to a corresponding electrical input signal terminal of a portable server for use in the aircraft; and a plurality of optical-to-electrical converter devices, each optical-to-electrical converter device being connected electrically to a corresponding electrical output signal terminal, wherein each optical-to-electrical converter device is configured so as to convert a received optical signal into a corresponding output electrical signal which is representative of the corresponding optical signal and to transmit the corresponding output electrical signal to the corresponding electrical output signal terminal.

The optical-to-electrical converter apparatus may comprise a power status signal electrical output terminal and a power status optical-to-electrical converter device, wherein the power status signal electrical output terminal is connected electrically to the power status optical-to-electrical converter device so as to provide an electrical power status signal which is representative of an optical power status signal received by the power status optical-to-electrical converter device.

The optical-to-electrical converter apparatus may comprise an electrical conductor extending between each optical-to-electrical converter device and the corresponding electrical output signal terminal.

Each optical-to-electrical converter device may comprise an optoelectronic optical sensor.

Each optical-to-electrical converter device may comprise a photodiode, a phototransistor and/or a light dependent resistor.

Each optical-to-electrical converter device may be configured to discriminate between different optical signals having different properties.

Each optical-to-electrical converter device may be configured to discriminate between different optical signals having different colours or wavelengths.

Each optical-to-electrical converter device may be configured for operation at a rate of up to 1 bit/s, 10 bit/s, 100 bit/s, 1 Kbit/s, or 10 Kbit/s.

According to an aspect or an embodiment of the present invention which may be provided independently of any of the foregoing aspects or embodiments of the present invention there is provided an optical isolator system for use in electrically isolating a portable server from a system of an aircraft, the optical isolator system comprising:

an electrical-to-optical converter apparatus for receiving an input electrical signal from the system of the aircraft and converting the input electrical signal into an optical signal which is representative of the input electrical signal; and an optical-to-electrical converter apparatus for receiving the optical signal from the electrical-to-optical converter apparatus, for converting the received optical signal into an output electrical signal which is representative of the received optical signal, and for transmitting the output electrical signal to the portable server.

The electrical-to-optical converter apparatus may be configured for receiving a plurality of input electrical signals from the system of the aircraft and converting the plurality of input electrical signals into a corresponding plurality of optical signals, wherein each optical signal is representative of a corresponding input electrical signal.

The optical-to-electrical converter apparatus may be configured for receiving a plurality of optical signals from the electrical-to-optical converter apparatus, for converting the received plurality of optical signals into a plurality of output electrical signals, each output electrical signal being representative of a corresponding received optical signal, and for transmitting the plurality of output electrical signals to the portable server.

The electrical-to-optical converter apparatus may comprise:

a plurality of electrical input signal terminals, each electrical input signal terminal being configured for connection to a corresponding electrical output signal terminal of the system of the aircraft; and a plurality of electrical-to-optical converter devices, each electrical-to-optical converter device being connected electrically to a corresponding electrical input signal terminal, wherein each electrical-to-optical converter device is configured so as to convert a corresponding input electrical signal received by the corresponding electrical input signal terminal into a corresponding optical signal which is representative of the corresponding input electrical signal.

The optical-to-electrical converter apparatus may comprise:

a plurality of electrical output signal terminals, each electrical output signal terminal being configured for connection to a corresponding electrical input signal terminal of the portable server for use in the aircraft; and a plurality of optical-to-electrical converter devices, each optical-to-electrical converter device being connected electrically to a corresponding electrical output signal terminal, wherein each optical-to-electrical converter device is configured so as to convert an optical signal received from a corresponding electrical-to-optical converter device into a corresponding output electrical signal which is representative of the corresponding optical signal and to transmit the corresponding output electrical signal to the corresponding electrical output signal terminal.

The electrical-to-optical converter apparatus and the optical-to-electrical converter apparatus may each comprise a connector or a housing, wherein the connectors or housings comprise complementary inter-engaging features.

One of the connectors or housings may comprise a key and the other of the connectors or housings comprises a complementary keyway or slot.

The connector or housing of the electrical-to-optical converter apparatus and the connector or housing of the optical-to-electrical converter apparatus may together define a plurality of compartments or chambers, wherein each compartment or chamber is configured to contain one of the electrical-to-optical converter devices and a corresponding one of the optical-to-electrical converter devices. Such an arrangement may ensure that an electrical-to-optical converter device and its corresponding optical-to-electrical converter device are optically isolated from each of the other electrical-to-optical converter devices and each of the other optical-to-electrical converter devices so as to avoid any cross-talk between the different output electrical signals transmitted to the portable server.

Each electrical-to-optical converter device and each optical-to-electrical converter device may be configured for operation at a rate of up to 1 bit/s, 10 bit/s, 100 bit/s, 1 Kbit/s, or 10 Kbit/s.

According to an aspect or an embodiment of the present invention which may be provided independently of any of the foregoing aspects or embodiments of the present invention there is provided a method for use in electrically isolating a portable server from a system of an aircraft, the method comprising:

receiving an input electrical signal from the system of the aircraft;

converting the input electrical signal into an optical signal which is representative of the input electrical signal;

receiving the optical signal;

converting the received optical signal into an output electrical signal which is representative of the received optical signal; and transmitting the output electrical signal to the portable server.

According to an aspect or an embodiment of the present invention which may be provided independently of any of the foregoing aspects or embodiments of the present invention there is provided a portable server for use in a system for wirelessly distributing content to a plurality of clients in a local area, wherein the portable server is configured for storing content, the portable server is configured for wireless communication with one or more of the clients for wireless distribution of at least some of the stored content to one or more of the clients, wherein at least some of the stored content comprises advertising content, and wherein the portable server is configured to:

assign a unique client identifier to a client when the client accesses the advertising content for the first time;

repeatedly collect data relating to the advertising content accessed by the client; and store, in the portable server, the collected data relating to the advertising content accessed by the client together with the unique identifier for the client for transmission, sharing, merging, storing and/or recording details of the advertising content accessed by the client and the unique client identifier to, with, or at, a central ad server.

The client identifier may exclude any personal information which could be used to identify a specific user of a client device.

The client identifier may exclude a name of the specific user of the client device.

The client identifier may exclude contact details of the specific user of the client device.

The client identifier may exclude an email address of the specific user of the client device.

The portable server may be configured to store the client identifier on a client device.

The portable server may be configured to store the client identifier as a persistent cookie on a browser of the client device.

The portable server may be configured to store the client identifier in application data on a mobile client device such as a mobile client device which uses an Android operating system or a mobile client device which uses an iOS operating system.

The local area may be associated with an aircraft.

The local area may be defined within an aircraft.

The local area may be defined by a cabin of an aircraft.

According to an aspect or an embodiment of the present invention which may be provided independently of any of the foregoing aspects or embodiments of the present invention there is provided a method for use in a system for wirelessly distributing content to a plurality of clients in a local area, the method comprising:

wirelessly distributing at least some of the content stored on a portable server from the portable server to one or more of the clients, wherein at least some of the stored content comprises advertising content:

assigning a unique client identifier to a client when the client accesses the advertising content for the first time;

repeatedly collecting data relating to the advertising content accessed by the client;

storing, in the portable server, the collected data relating to the advertising content accessed by the client together with the unique identifier for the client; and transmission, sharing, merging, storing and/or recording details of the advertising content accessed by the client and the unique client identifier to, with, or at, a central ad server.

Such a method may allow a user's advertising content views or behaviours to be stored or recorded in an anonymised fashion.

According to an aspect or an embodiment of the present invention which may be provided independently of any of the foregoing aspects or embodiments of the present invention there is provided a portable server for use in a system for wirelessly distributing content to a plurality of clients in a local area, wherein the portable server is configured for storing content, the portable server is configured for wireless communication with one or more of the clients for wireless distribution of at least some of the stored content to one or more of the clients, wherein the portable server comprises a display for displaying status information relating to a status of the portable server, and wherein the display is configured so that the displayed status information persists after power is removed from the display.

The display may comprise an e-Paper or an e-link display.

The status information may comprise information relating to at least one of:

the content stored on the portable server;

a date when the content stored on the portable server was last updated;

any errors generated by the portable server during the operation of the portable server;

a boot count indicating the number of times the portable server has been booted over a pre-determined time period;

a user count indicating the number of clients that have accessed the content stored on the portable server; and a battery state indicating a charge level for a battery of the portable server.

Features of any one aspect may be applied as features of any other aspect in any appropriate combination. For example, any one of method, system, apparatus or server features may be applied as any other of method, system, apparatus or server features.

BRIEF DESCRIPTION OF THE DRAWINGS

The present invention will now be described by way of non-limiting example only with reference to the following drawings of which:

FIG. 16A is a first perspective view of an electrical-to-optical converter apparatus of the optical isolator system of FIG. 13;

FIG. 16B is a second perspective view of an electrical-to-optical converter apparatus of the optical isolator system of FIG. 13;

FIG. 16C is a third perspective view of an electrical-to-optical converter apparatus of the optical isolator system of FIG. 13;

FIG. 16D is a perspective view of a sub-assembly of the electrical-to-optical converter apparatus of the optical isolator system of FIG. 13;

FIG. 16E is a perspective view of a part of the electrical-to-optical converter apparatus of the optical isolator system of FIG. 13;

FIG. 17A is a first perspective view of an optical-to-electrical converter apparatus of the optical isolator system of FIG. 13;

FIG. 17B is a second perspective view of an optical-to-electrical converter apparatus of the optical isolator system of FIG. 13; and FIG. 17C is a third perspective view of an optical-to-electrical converter apparatus of the optical isolator system of FIG. 13.

DETAILED DESCRIPTION OF THE DRAWINGS

Figure 1:
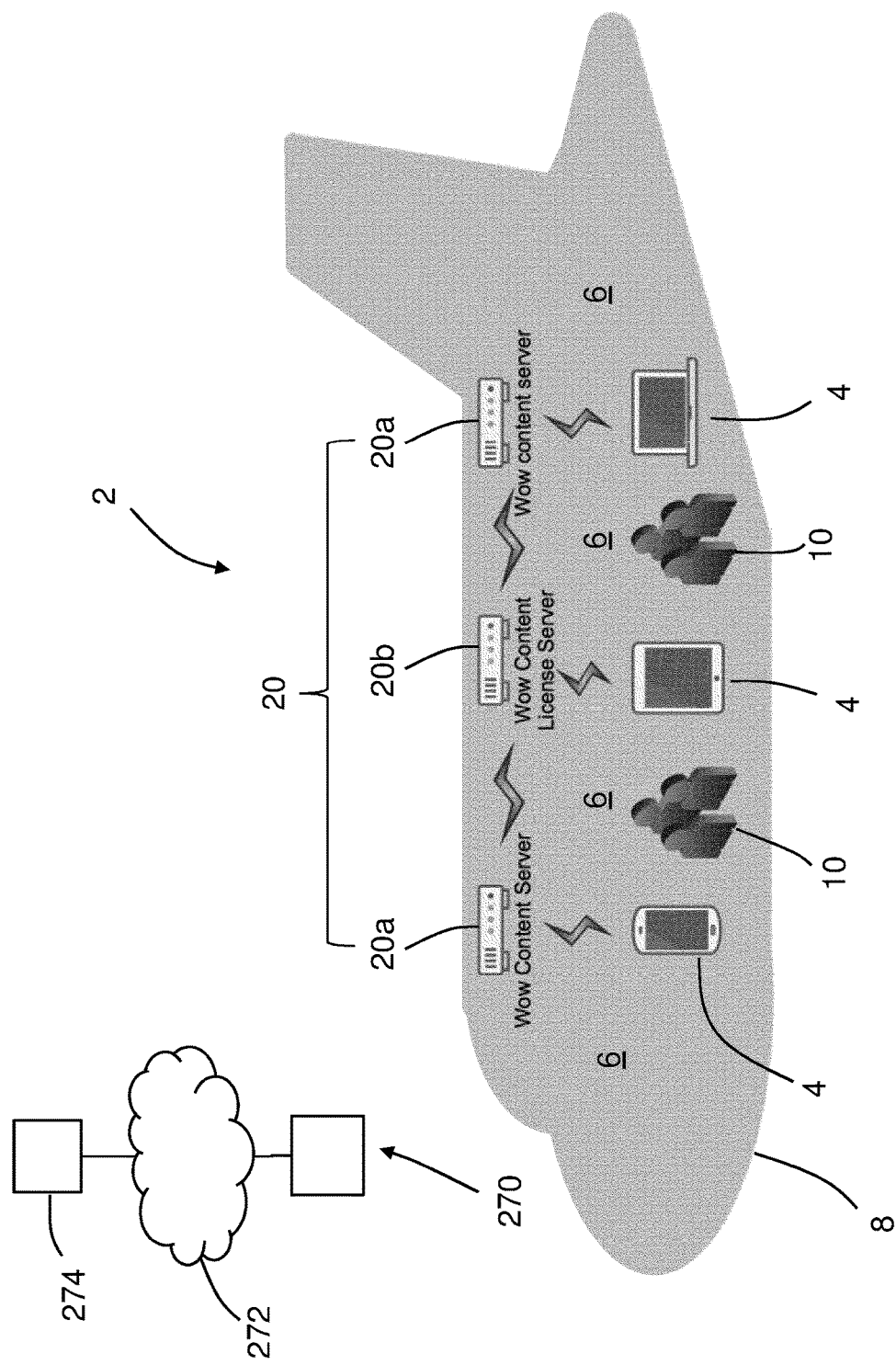
FIG. 1 is a schematic of a system for wirelessly distributing content to a plurality of clients in a cabin of an aircraft.

Referring initially to FIG. 1 there is shown a portable system generally designated 2 for wirelessly distributing content to a plurality of clients in the form of a plurality of mobile devices 4 in a local area in the form of a cabin 6 of an aircraft 8. Each mobile device 4 may be operated by a corresponding user 10. The portable system may be configured to deliver content to the mobile devices 4 without any requirement for the portable system 2 to be connected to, or to have access to, the internet.

The portable system 2 includes a plurality of portable servers 20 in the form of a plurality of portable content servers 20a and one or more portable content and Digital Rights Management (DRM) license servers 20b. Each portable server 20 is arranged around the cabin 6 for wireless communication with one or more corresponding mobile devices 4. Each portable server 20 is also arranged around the cabin 6 so as to permit wireless communication with at least one of the other portable servers 20 so that, on power up of the portable servers 20, the portable servers 20 together form a wireless mesh network within the cabin 6.

Each mobile device 4 may a portable computing device which includes software such as a compatible browser or an app to permit the user 10 to communicate with, and select content stored on, any one of the portable servers 20 to permit the user 10 to view and/or listen to the content via the mobile device 4. For example, each mobile device 4 may be a smart phone, a tablet or a laptop. Each mobile device 4 may comprise an Apple iOS device, an Android device, an Apple MacBook and/or a laptop running Windows or Linux, and/or a device with an HTML5 compliant browser. The software may be installed on the corresponding mobile device 4 in advance of boarding the aircraft 8.

Each mobile device 4 may be carried onto the aircraft 8 by the corresponding user 10 before a flight and carried off the aircraft 8 by the corresponding user 10 after the flight. The portable system 2 does not require any dedicated or fixed client devices to be provided or to be permanently installed in the aircraft 8 for each user 10 to permit each user 10 to select, view and/or listen to content. The system 2 is designed for use in a Bring Your Own Device (BYOD) model. The BYOD model allows users 10 to use their own compatible mobile devices 4 to access the system 2: iOS, Android, PC or Mac.

Figure 2:
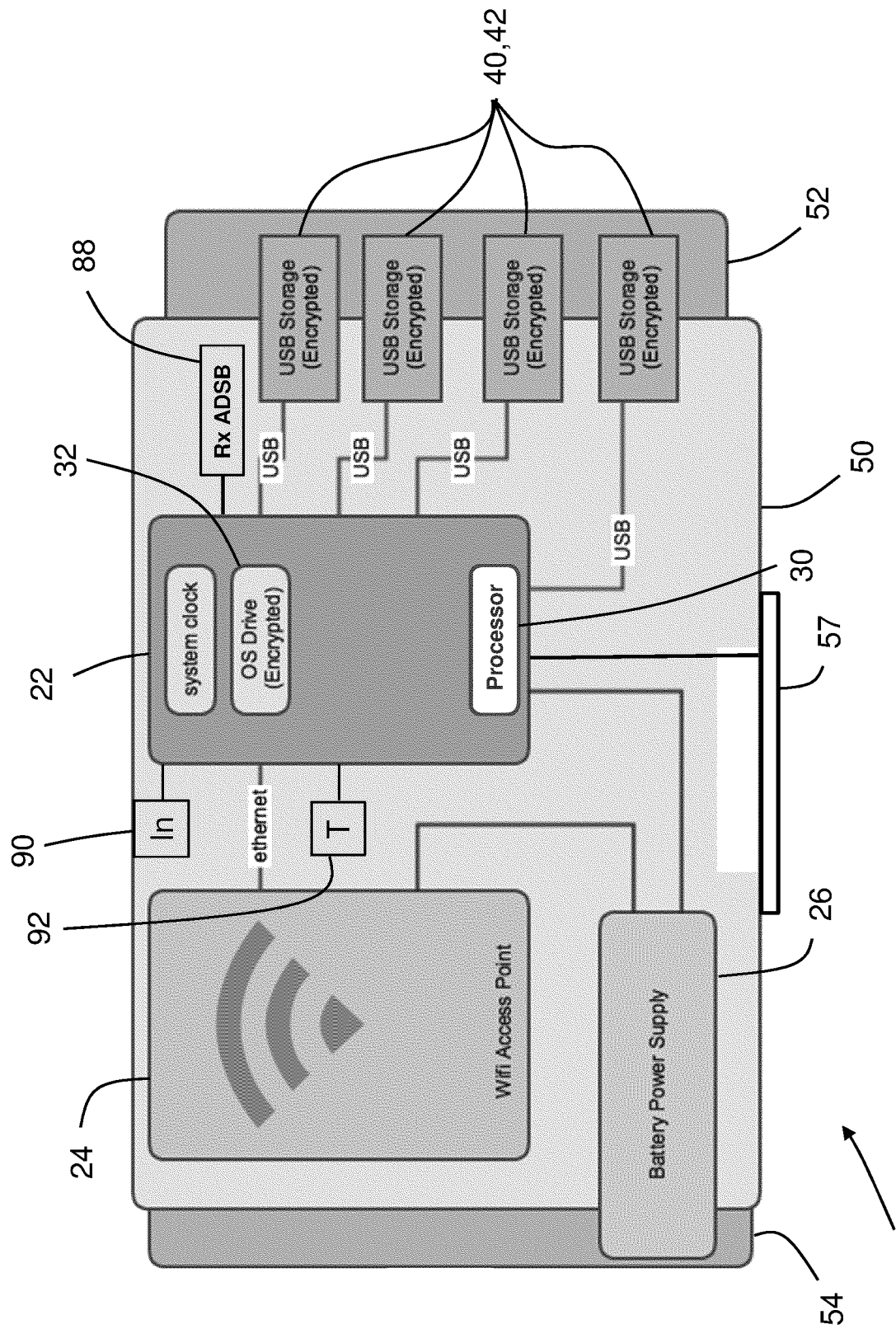
FIG. 2 is a functional block diagram of a portable content server of the system of FIG. 1.

As shown in FIG. 2, each portable content server 20a includes a single board computer 22, a wireless transceiver in the form of a Wi-Fi access point 24 and a battery 26 for supplying power to the single board computer 22 and the Wi-Fi access point 24. The single board computer 22 includes a processor 30 and an encrypted operating system drive 32 for storing operating system software. The processor 30 may have a relatively low power consumption for longer battery life. For example, the processor 30 may be an ARM processor. Each portable content server 20a further includes a plurality of USB ports 40, each USB port 40 being configured to receive a corresponding encrypted USB storage device 42 such as an SD card. Each of the USB storage devices 42 may be encrypted with LUKS using an aes-xts cipher with a 256-bit key.

Each portable content server 20a further includes a display 57 for displaying status information relating to a status of the portable content server 20a. The display 57 is configured so that the displayed status information persists after power is removed from the display 57. For example, the display 57 may include e-Paper or e-Ink or be an e-Paper or e-link display. The status information may relate to at least one of: the content stored on the portable content server 20a; a date when the content stored on the portable content server 20a was last updated; any errors generated by the portable content server 20a during the operation of the portable content server 20a; a boot count indicating the number of times the portable content server 20a has been booted over a pre-determined time period; a user count indicating the number of clients that have accessed the content stored on the portable content server 20a; and a battery status or charge level of the battery 26 of the portable content server 20a. The portable content server 20a further includes a tamper proof case 50, a secure removable USB port access panel 52, and a removable battery access panel 54. The secure USB port access panel 52 is attached to the tamper proof case 50 by one or more security fasteners in the form of one or more torx security screws (not shown) which require special tools for removal of the secure USB port access panel 52 to provide access to the USB ports 40.

Figure 3:
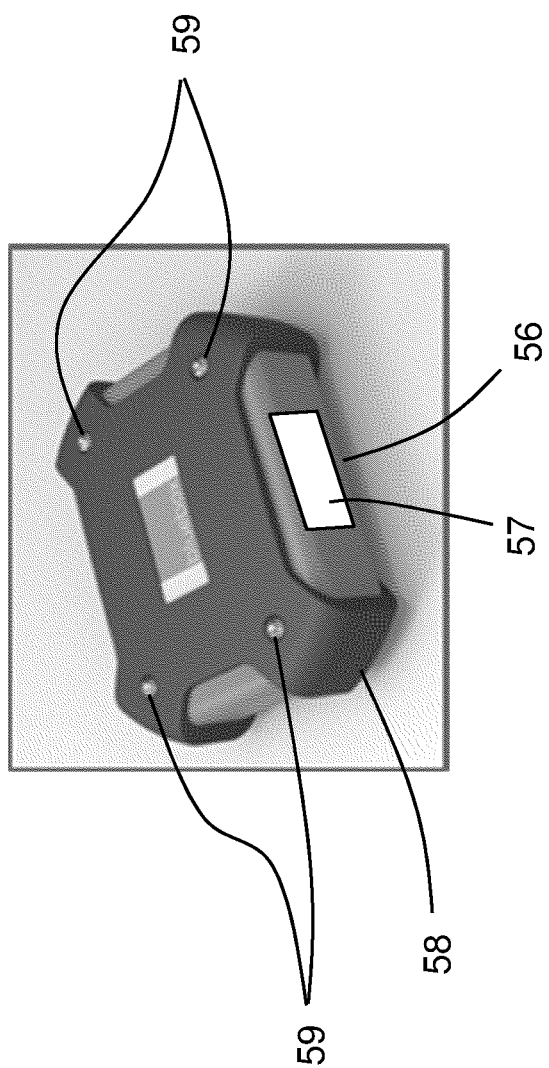
FIG. 3 shows an exterior view of a portable content server of the system of FIG. 1.

As shown in more detail in FIG. 3, the tamperproof case 50 includes an inner shell 56 defined by a two inner shell parts (not shown explicitly) such as two moulded inner shell halves (not shown explicitly). Access to the inner shell 56 is controlled by an outer access arrangement 58 which is secured to the inner shell 56 by security fasteners such as torx security screws 59. One of ordinary skill in the art will understand that physical tamper-proofing of the case 50 can be circumvented by a determined attacker and, as such, the physical measures described above are not relied upon as a means of content protection.

Figure 4:
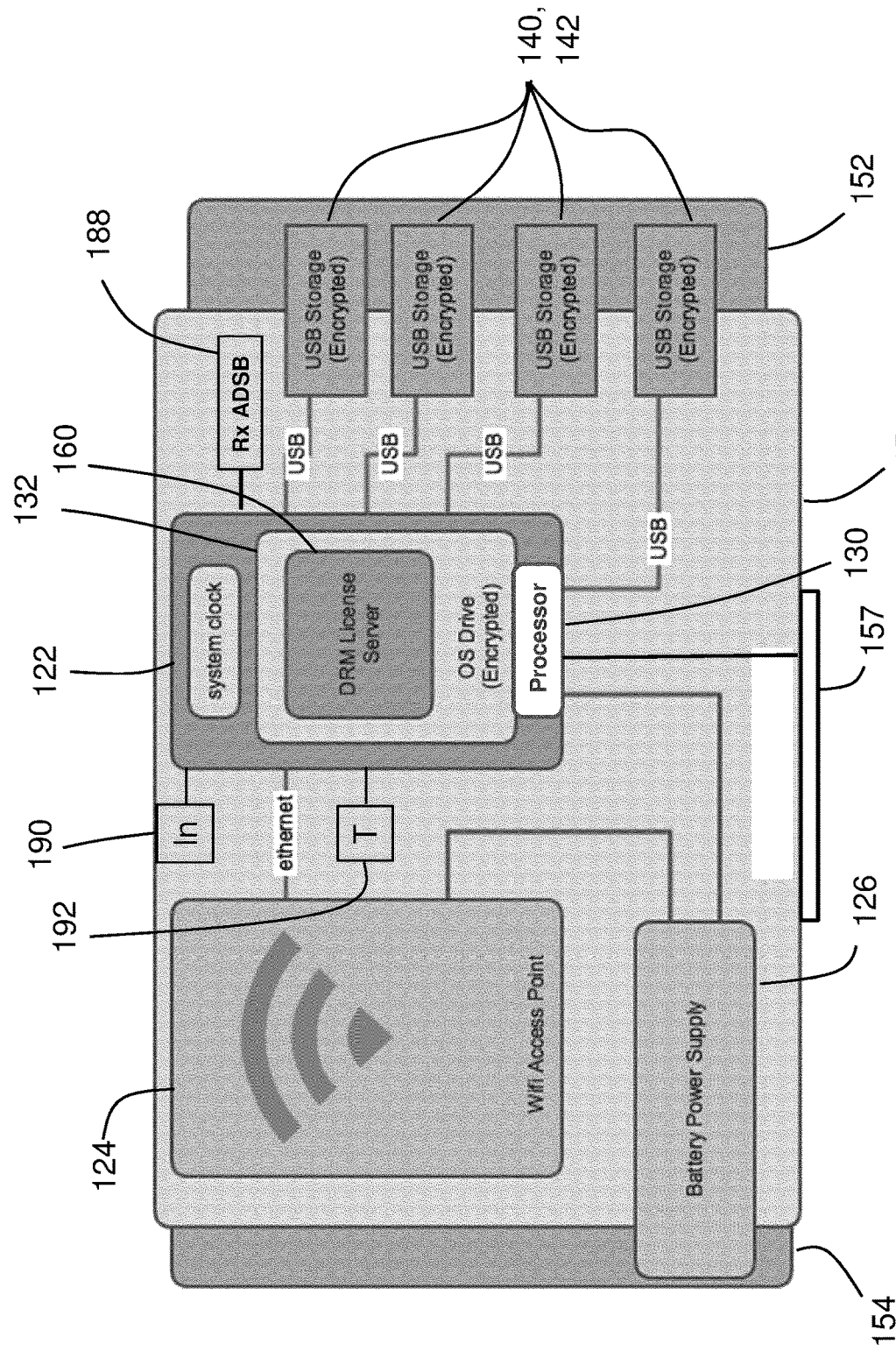
FIG. 4 is a functional block diagram of a portable DRM license server of the system of FIG. 1.

As shown in FIG. 4, each portable content and DRM licence server 20b includes many of the same features as a content server 20a. The portable content and DRM licence server 20b shown in FIG. 4 and the portable content server 20a shown in FIG. 2 have many like features, with the features of the portable content and DRM licence server 20b shown in FIG. 4 being identified with the same reference numeral as the corresponding features of the portable content server 20a of FIG. 2 incremented by "100". Specifically, as shown in FIG. 4, each portable content and DRM licence server 20b includes a single board computer 122, a Wi-Fi access point 124 and a battery 126 for supplying power to the single board computer 122 and the Wi-Fi access point 124. The single board computer 122 includes a processor 130, and an encrypted operating system drive 132 for storing DRM licence server software 160. The processor 130 may be selected according to its ability to support the DRM license server software 160. For example, the processor 130 may be an Intel processor.

Each portable content and DRM licence server 20b further includes a plurality of USB ports 140, each USB port 140 being configured to receive a corresponding encrypted USB storage device 142 such as an SD card. Each of the USB storage devices 142 may be encrypted with LUKS using an aes-xts cipher with a 256-bit key.

Each portable content and DRM licence server 20b further includes a display 157 for displaying status information relating to a status of the portable content and DRM licence server 20b. The display 157 is configured so that the displayed status information persists after power is removed from the display 157. For example, the display 157 may include e-Paper or e-Ink or be an e-Paper or e-Ink display. The status information may relate to at least one of: the content stored on the portable content and DRM licence server 20b; a date when the content stored on the portable content and DRM licence server 20b was last updated; any errors generated by the portable content and DRM licence server 20b during the operation of the portable content and DRM licence server 20b; a boot count indicating the number of times the portable content and DRM licence server 20b has been booted over a pre-determined time period; a user count indicating the number of clients that have accessed the content stored on the portable content and DRM licence server 20b; and a battery status or charge level of the battery 126 of the portable content and DRM licence server 20b.

Each portable content and DRM licence server 20b further includes a tamper proof case 150, a secure removable USB port access panel 152, and a removable battery access panel 154. The secure USB port access panel 152 is attached to the tamper proof case 150 by one or more security fasteners in the form of one or more torx security screws (not shown) which require special tools for removal of the secure USB port access panel 152 to provide access to the USB ports 140.

Figure 5:
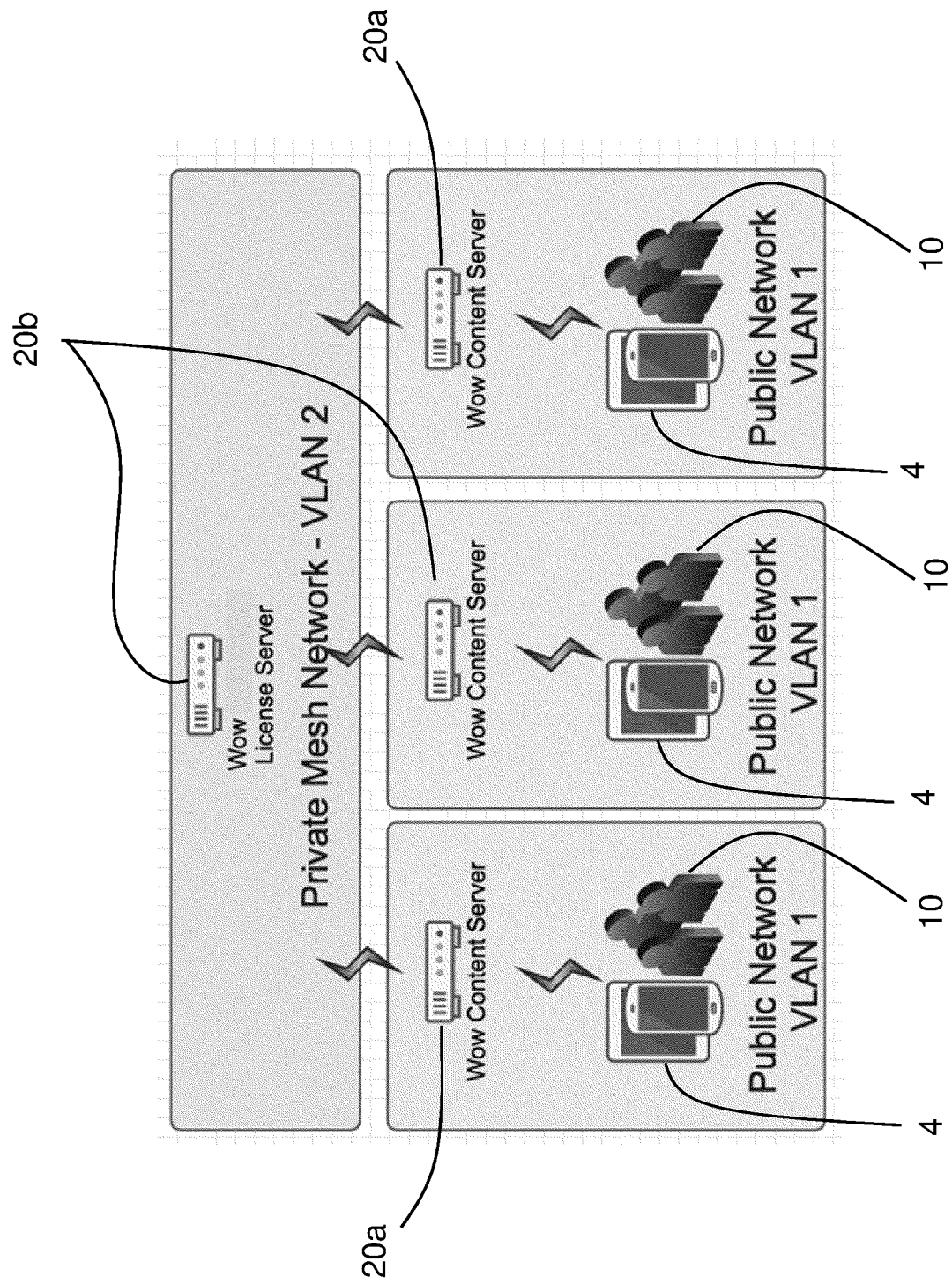
FIG. 5 is a schematic illustrating the operation of the system of FIG. 1.

As shown in FIG. 5, the system may be divided into two Virtual Local Area Networks (VLANs). Specifically, each content server 20a may communicate with one or more corresponding mobile devices 4 over a corresponding public VLAN (VLAN 1). The content and DRM licence server 20b may be considered to include content server component which defines or implements content server functionality and a DRM licence server component which defines or implements DRM licence server functionality. Each content server 20a may be considered to communicate with the DRM licence server component of the content and DRM licence server 20b over a private mesh VLAN 2. Communications that must cross the private mesh VLAN 2 are managed by a forward proxy on the content server 20a or the content and DRM licence server 20b. The proxy receives requests, and based on defined traffic rules, will forward where appropriate to other servers 20a, 20b on the private mesh VLAN 2. One of ordinary skill in the art will understand that FIG. 5 is an illustration of the virtual configuration of the public VLAN (VLAN 1) and the private mesh VLAN 2 and that, in reality, each of the content servers 20a and the content and DRM licence server 20b is actually configured to communicate with at least one of the other content servers 20a and the content and DRM licence server 20b as shown in FIG. 1.

In use, a user 10 who wishes to download a content item must first join the network by communicating wirelessly with one of the servers 20a, 20b via a user interface generated by the pre-installed software running on their own mobile device 4. The user 10 may be required to complete an authentication and/or registration process via the mobile device 4 before the user 10 may request a content item via the user interface. In response to the user request, the mobile device 4 requests an encryption (DRM) license key from the content and DRM licence server 20b either directly or indirectly via a content server 20a over the wireless mesh network. The content and DRM licence server 20b responds to the request by forwarding the license key to the mobile device 4 either directly or indirectly via a content server 20a over the wireless mesh network. The content and DRM licence server 20b or the content server 20a reads the encrypted content from one of the encrypted USB storage devices 142 connected to the content and DRM licence server 20b or the content server 20a and forwards the encrypted content together with the license key to the mobile device 4. The pre-installed software on the mobile device 4 uses the licence key to decrypt the encrypted content for playback to the user 10.

It should be understood that the servers 20a, 20b may store the same content. Content downloaded to one of the servers 20a, 20b may be distributed to the other servers via the wireless mesh network in order to synchronise the content across all of the servers 20a, 20b. This may be particularly advantageous when it is necessary to download or update the content in a short period of time, for example during a turnaround between flights. For example, to update the content stored on the servers 20a, 20b, one or more of the encrypted USB storage devices 42 may be simply disconnected from one of the servers 20a, 20b and replaced with one or more replacement encrypted USB storage devices 42, wherein the one or more replacement encrypted USB storage devices 42 together store the updated content. The updated content is subsequently distributed between all of the servers 20a, 20b over the wireless mesh network.

As shown in FIG. 1, the operator of the system 2 (e.g. the airline or the airport operator) may be provided with a content loader device 270 which may be portable or which may be located outside, for example remotely from, the local area 6 defined by the aircraft 8. The content loader device 270 may, for example, be located at or near a gate at an airport. The content loader device 270 may be connected via the Internet 272 to one or more cloud content servers 274. The content loader device 270 authenticates to the one or more cloud content servers 274 and securely retrieves encrypted content from the one or more cloud content servers 274 via the Internet 272, for example using an SSL protected web protocol.

One or more of the encrypted USB storage devices 42, 142 may be physically transported to, and connected with, the content loader device 270 periodically to permit the updated content to be downloaded periodically from the content loader device 270 to one or more of the encrypted USB storage devices 42, 142 over a wired connection. The encrypted USB storage devices 42, 142 may subsequently be transported back onto the aircraft 8 and reconnected to one or more of the servers 20a, 20b. The content loader device 270 may be carried onto the plane if required for ease of connection with one or more of the encrypted USB storage devices 42, 142.

The system may also be capable of receiving information or data which is transmitted or broadcast from the aircraft 8, for example from one or more of the aircraft systems.

One or more of the servers 20*a*, 20*b* may provide "moving map" information. This may allow a user 10 to view a map showing the current position of the aircraft 8 and other journey information (e.g. flight information such as altitude, ETA etc.). To facilitate this, one or more of the servers 20*a*, 20*b* may include a UHF radio receiver 88, 188 to monitor for position broadcasts sent by the aircraft 8 for air traffic control purposes. These are known as ADS-B-out (Automatic Dependent Surveillance-Broadcast out) transmissions. The messages may contain position, ICAO callsign (hex), altitude, flight number, and other data. The processors 30, 130 may parse the received position broadcasts to determine current flight information for display on a moving map at the one or more clients 4.

Monitoring position broadcasts sent by the aircraft 8 may avoid any requirement to modify the aircraft systems. In addition, monitoring position broadcasts sent by the aircraft 8 in this way does not require any of the servers to be compatible with any particular type of aircraft system. Monitoring position broadcasts sent by the aircraft 8 in this way does not require any of the servers to transmit, write or send commands to an aircraft system. Consequently, the servers 20*a*, 20*b* are not capable of transmitting, writing or sending commands to the aircraft system and are not, therefore, capable of controlling an aircraft system. Also, monitoring position broadcasts sent by the aircraft 8 in this way may avoid any requirement to use a GPS receiver located inside one or more of the servers. This may be advantageous because a GPS receiver located inside a server 20*a*, 20*b* may not receive sufficient signal to establish a fix.

The ADS-B is a broadcast signal and messages may be received from other aircraft in the vicinity of the aircraft 8. Thus, the processor 30, 130 of one or more of the servers 20*a*, 20*b* may apply logic to the received data in order to determine if it is from the aircraft 8 on which the server 20*a*, 20*b* is installed.

The antenna gain of the UHF radio receiver 88, 188 may be reduced to the lowest level at which signals can be received from the aircraft 8. This is to reduce chatter from nearby aircraft. One or more of the servers 20*a*, 20*b* may store a callsign whitelist which contains the ICAO callsigns of each aircraft on which it may be installed. One or more of the servers 20*a*, 20*b* may use the whitelist to filter received data and discard any position information from aircraft not on the whitelist.

Where there is a conflict, i.e. data is received from two or more aircraft on the whitelist at the same time, the processor 30, 130 of one or more of the servers 20*a*, 20*b* may analyse the number of messages received from each aircraft, and select the aircraft which has sent the most messages as the installed aircraft. Where there is not a clear preference from the count, the system 2 will not display information at one or more of the clients 4 that may be incorrect, e.g. where there are two possible flight numbers.

Additionally or alternatively, one or more of the servers 20*a*, 20*b* may comprise a GPS receiver (not shown). The GPS receiver (not shown) does not receive a signal in the cabin during flight, but may be used on the ground for tracking, so that the system 2 can report its location the next time it has a network connection.

The system 2 may be capable of transmitting information from the aircraft system to one or more of the clients 4. The system 2 may be capable of broadcasting information to the plurality of clients 4. For example, one or more of the servers 20*a*, 20*b* may include an audio signal input 90, 190 for receiving an audio signal from the aircraft 8. The audio signal input 90, 190 is connected to the cabin intercom system headphone or line-out audio jack. The processor 30, 130 monitors the audio signal level and determine when an announcement is in progress during a flight. The processor 30, 130 smooths the audio signal level to provide a reliable audio signal measurement. The processor 30, 130 uses an audio signal level threshold to determine when an announcement is in progress. When the processor 30, 130 determines that an announcement is in progress, each server 20*a*, 20*b* sends a command to the one or more corresponding clients 4 on the network to pause playback of content and request that the user 10 pays attention to the cabin announcement. When the announcement ends, the audio signal drops below the threshold level and this is detected by the processor 30, 130. Each server 20*a*, 20*b* then sends a command to the clients 4 in the cabin 6 to resume playback of content.

One or more of the servers 20*a*, 20*b* may have a physical control or button on the exterior (not shown) to provide a manual signal that an announcement is in progress. In response to a button press on any one of the servers 20*a*, 20*b*, the server 20*a*, 20*b* concerned transmits a signal over the mesh network to all the other servers 20*a*, 20*b*, playback is interrupted at all of the clients 4 on the network, and each user 10 is informed that an announcement is in progress by way of a visual and/or audio message via the corresponding client 4.

One or more of the servers 20*a*, 20*b* may have a network interface (not shown) and an API command to allow a crew device and/or a crew app to provide the manual signal that an announcement is in progress. One or more of the servers 20*a*, 20*b* may provide an API so that a crew device such as a mobile or tablet (not shown) can communicate with the one or more servers to provide administrator control and information. The API may use the mesh network between the servers 20*a*, 20*b* to support usage across the cabin.

One or more of the servers 20*a*, 20*b* may be configured to allow any of the clients to communicate with the crew device so that the crew device (not shown) may receive a notification when a passenger makes a request. The message can include information about the request, e.g. a food or duty free order, with a list of items and cost. The crew device (not shown) may be a $3^{rd}$ party Point of Sale device. In this case the system API can automate the message delivery to the PoS device with the transaction details and costs. The API may allow the PoS device to take the payment and then provide an authorisation code back to the system 2 to confirm or reject the payment.

One or more of the servers 20*a*, 20*b* may provide a messaging feature to connected client devices 4. This may be used for crew announcements, and also for passenger chatroom or seat-to-seat messaging. The messaging feature may use the mesh network to route messages between the servers 20*a*, 20*b* so that e.g. passengers at the front of the aircraft who are connected to one server 20*a*, 20*b* can communicate with passengers at the rear of the aircraft who are connected to a different server 20*a*, 20*b*.

One or more of the servers 20*a*, 20*b* may comprise a temperature sensor 92, 192 for sensing a temperature of the server 20*a*, 20*b*. If the temperature sensed by the temperature sensor exceeds a threshold, then the power supply 26, 126 is disconnected from the single board computer 22, 122 and the Wi-Fi access point 24, 124.

The power supply 26, 126 may provide both a 5V and a 12V power output. This may support different power requirements for the internal components.

One or more of the servers 20a, 20b may have air vents to allow air circulation without the need for a fan.

One or more of the servers 20a, 20b may be constructed from a fire retardant material to comply with air safety regulations.

One or more of the servers 20a, 20b may incorporate removable side and end panels as separate components. This may allow the panels to be manufactured in airline colours, without remanufacturing the main body components.

One or more of the servers 20a, 20b may have feet on the bottom and/or the top. The feet may provide friction and prevent sliding when the server 20a, 20b is installed in the aircraft. The feet may be on the bottom and the top of the server 20a, 20b so that it can be orientated in either direction.

Figure 6:
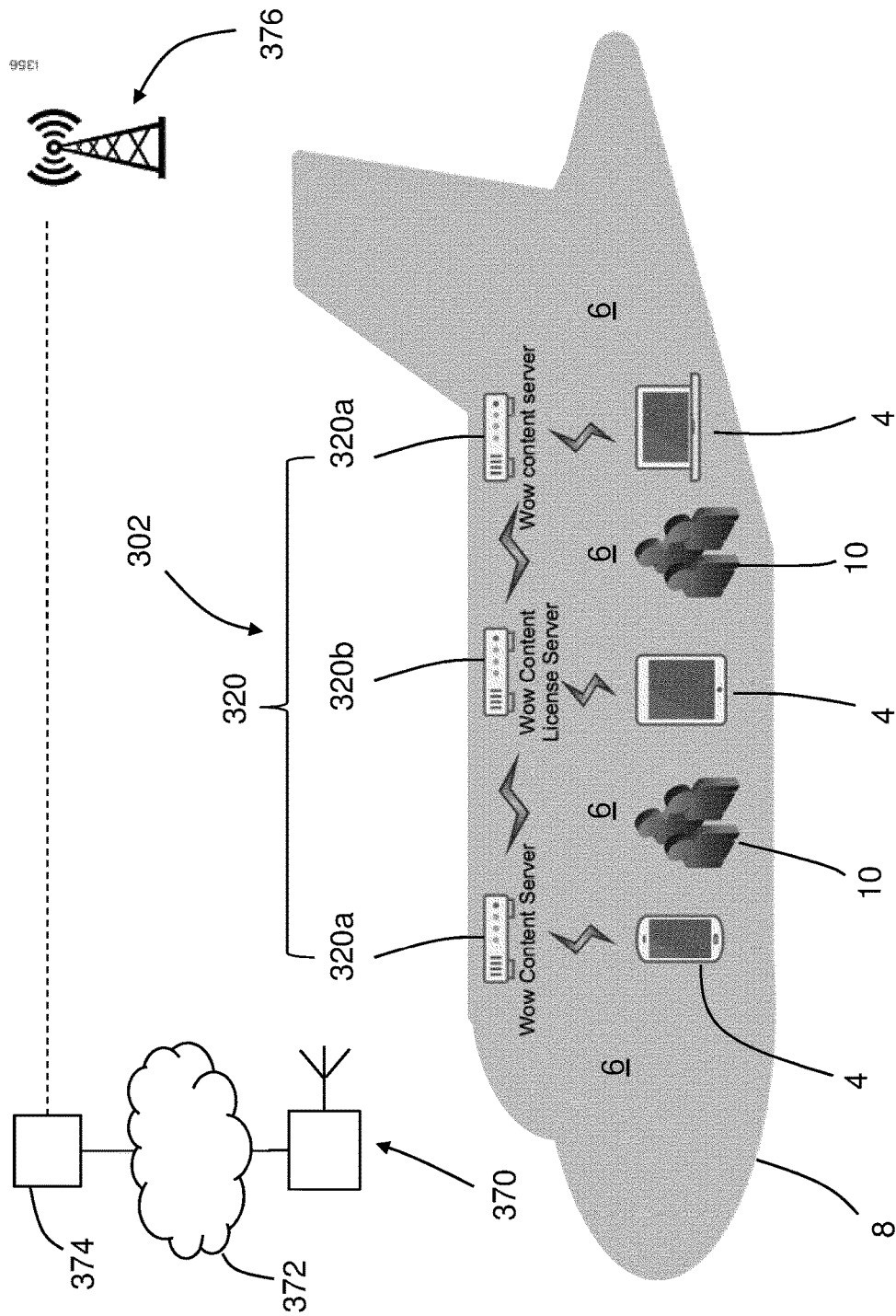
FIG. 6 is a schematic of a first alternative system for wirelessly distributing content to a plurality of clients in a cabin of an aircraft.

FIG. 6 shows an alternative system 302 for wirelessly distributing content to a plurality of clients in the form of a plurality of mobile devices 4 in a local area in the form of a cabin 6 of an aircraft 8. Like the system 2 described with reference to FIGS. 1 to 5, the alternative system 302 includes a plurality of portable servers 320, in the form of a plurality of portable content servers 320a and one or more portable content and Digital Rights Management (DRM) licence servers 320b. Each portable server 320 is arranged around the cabin 6 of the aircraft 8 for wireless communication with one or more corresponding mobile devices 4. Each portable server 320 is also arranged around the cabin 6 so as to permit wireless communication with at least one of the other portable servers 320 so that, on power up of the portable servers 320, the portable servers 320 together form a wireless mesh network within the cabin 6.

Figure 7:
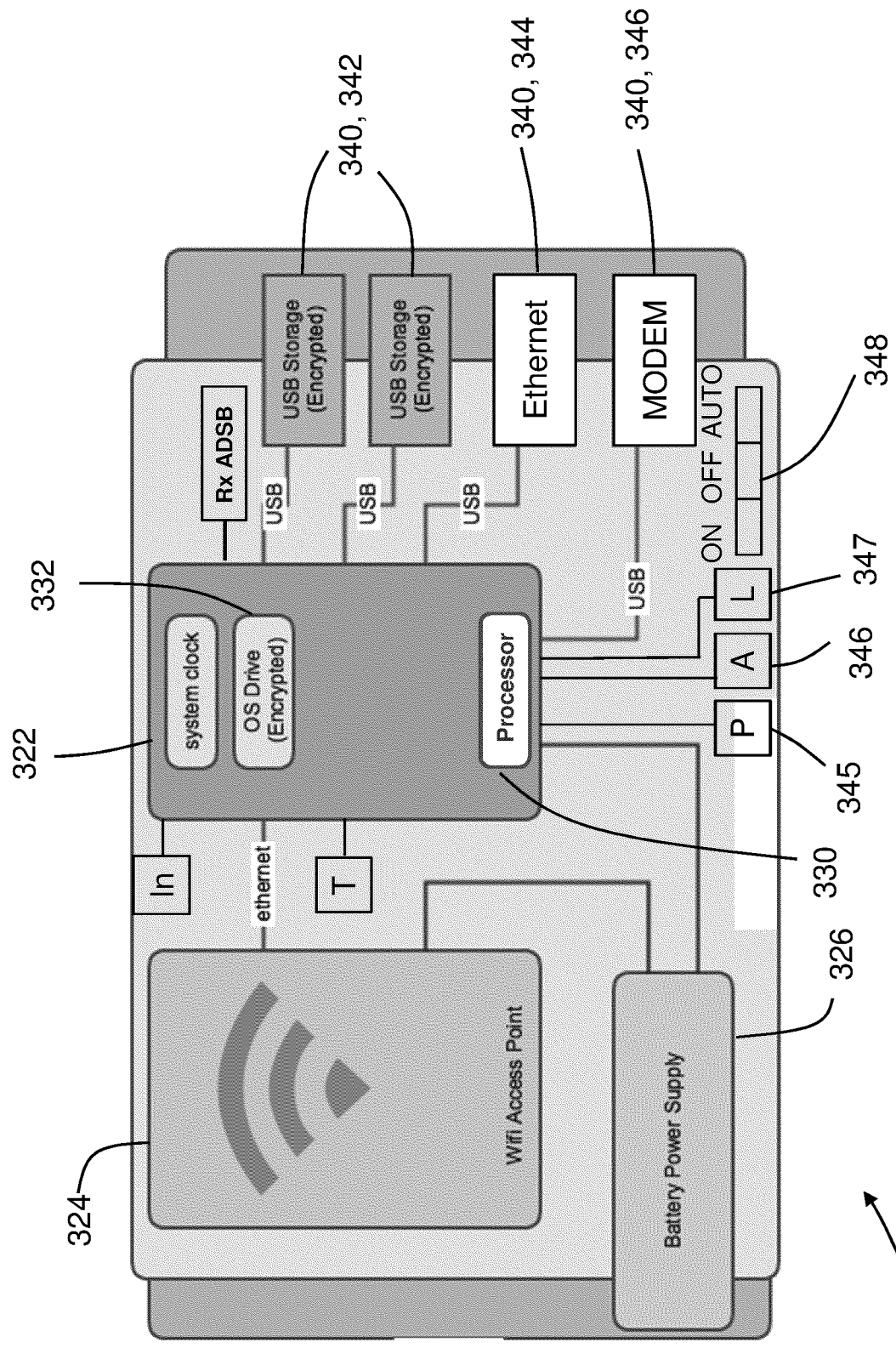
FIG. 7 is a functional block diagram of a portable content server of the first alternative system of FIG. 6.

As shown in FIG. 7, each portable content server 320a includes a single board computer 322, a wireless transceiver in the form of a Wi-Fi access point 324 and a battery 326 for supplying power to the single board computer 322 and the Wi-Fi access point 324. The single board computer 322 includes a processor 330 and an encrypted operating system drive 332 for storing operating system software. The processor 330 may have a relatively low power consumption for longer battery life. For example, the processor 330 may be an ARM processor. Each portable content server 320a further includes a plurality of USB ports 340.

One of ordinary skill in the art will understand that the portable content and Digital Rights Management (DRM) licence server 320b may include many features which correspond to the features of the portable content server 320a described herein with reference to FIG. 7. The content and DRM licence server 320b may include DRM licence software installed on an encrypted operating system drive of the content and DRM licence server 320b. The content and DRM licence server 320b may include a processor selected according to its ability to support the DRM license server software. For example, the content and DRM licence server 320b may include an Intel processor. The following description of each portable content server 320a may apply equally to the content and DRM licence server 320b.

Each portable content server 320a includes encrypted USB storage devices 342 connected to two of the USB ports 340. Each portable content server 320a includes a USB wired Ethernet network adapter 344 connected to one of the USB ports 340. Each portable content server 320a also includes a USB cellular MODEM 346 such as a USB 3G/4G/LTE adapter connected to one of the USB ports 340. Each portable content server 320a includes one or more sensors for detecting when the aircraft 8 is stationary and/or on the ground to determine whether the cellular modem 346 may be activated. Specifically, each portable content server 320a includes a pressure sensor 345 for sensing barometric pressure which may be indicative of the aircraft's altitude. The processor 330 may calculate vertical speed by converting a rate of change of pressure into a rate of change of altitude. Each portable content server 320a includes a 3-axis accelerometer 346. The accelerometer 346 may measure instantaneous acceleration and the processor 330 may calculate the difference from the current rolling average acceleration in each axis. If the difference in acceleration from the rolling average exceeds a threshold, then the processor 330 determines that the aircraft 8 is moving. Each portable content server 320a further includes a light sensor 347 such as a light sensitive resistor, photocell, photodiode or the like for measuring light levels in the environment in which the portable content server 320a is located. The light sensor 347 may be used to detect light when the portable content server 320a is located in an overhead luggage bin. In this case, the portable content server 320a must be correctly oriented in the luggage bin to detect light when the bin is open. The portable content server 320a may have a fascia which is printed with guidance on the correct orientation, for example "This side facing the cabin", "This way up" and/or the like.

In addition, each portable content server 320a includes a three position switch 348 for use in controlling the cellular modem 346 as will be described below. As shown in FIG. 7, the switch positions may be ON, OFF, AUTO. ON forces the cellular modem 346 to be powered. OFF removes power from the cellular modem 346. When in AUTO mode, the processor 330 analyses data from at least one of the pressure sensor 345, the accelerometer 346 and the light sensor 347 to determine whether the aircraft 8 is on the ground in order to determine whether to provide power to the cellular modem 346.

The processor 330 applies logic to the signals from the sensors 345, 346, 347 to implement a policy for activation of the cellular modem 346. The policy may differ between regulatory regions hence a variable behaviour may be implemented in software to observe/disregard some sensor inputs, and to vary the quantitative threshold values in use. Example policies may be:

Policy A

IF—the altitude is below a first height threshold (e.g. 1500 feet),

AND—no motion is detected for a first time period (e.g. 120 seconds),

AND—vertical speed is less than a first vertical speed (e.g. 50 feet per minute), ENABLE the modem.

IF motion is detected for a second time period (e.g. 20 seconds or longer),

DISABLE the modem.

IF the altitude is greater than a second height threshold (e.g. 1600 feet),

DISABLE the modem.

If vertical speed is greater than a second vertical speed (e.g. 60 feet per minute), DISABLE the modem.

Policy B

IF—the altitude is below a first height threshold (e.g. 1000 feet),

AND—no motion is detected for a first time period (e.g. 300 seconds),

AND—light is detected,

ENABLE the modem.

IF motion is detected for a second time period (e.g. 20 seconds or longer),

DISABLE the modem.

IF the altitude is greater than a second height threshold (e.g. 1100 feet),
DISABLE the modem.
If no light is detected,
DISABLE the modem.

The use of asymmetric threshold values builds hysteresis into the activation of the cellular modem 346 to prevent rapid oscillation between the on and off states.

In use, one or more of the servers 320a, 320b may download content by simply replacing one or both of the portable USB storage devices 342 in a manner identical to that already described with reference to the system 2 with reference to FIGS. 1 to 5. With reference to FIG. 6, content may be downloaded and/or updated to the portable USB storage devices 342 by connecting the portable USB storage devices 342 to a content loader device 370 which may be provided to the operator of the system 302 (e.g. the airline or the airport operator). The content loader device 370 may be portable. The content loader device 370 may be located outside, for example remotely from, the local area 6 defined by the aircraft 8. The content loader device 370 may, for example, be located at or near a gate at an airport. The content loader device 370 may be connected via the Internet 372 to one or more cloud content servers 374. The content loader device 370 authenticates to the one or more cloud content servers 374 and securely retrieves encrypted content from the one or more cloud content servers 374 via the Internet 372, for example using an SSL protected web protocol.

Additionally or alternatively, content may be downloaded and/or updated to one or more of the servers 320a, 320b by connecting one or more of the servers 320a, 320b to the content loader device 370 using a wired connection via the wired Ethernet adapter 344. For example, the content loader device 370 may be carried onto the aircraft 8 and connected to one or more of the servers 320a, 320b, or one or more of the servers 320a, 320b may be carried off the aircraft 8 and connected to the content loader device 370.

Additionally or alternatively, the Wi-Fi access point 324 of one or more of the servers 320a, 320b may be used to communicate wirelessly with the content loader device 370 for the purposes of downloading and/or updating content wirelessly to one or more of the servers 320a, 320b.

Additionally or alternatively, when the cellular modem 346 is enabled, the cellular modem 346 of one or more of the servers 320a, 320b may connect to the cloud content server 374 via a cellular network 376 to download content items and/or updates. One or more of the servers 320a, 320b may authenticate to the cloud content server 374 via the cellular network 376. One or more of the servers 320a, 320b may securely download encrypted content items from the cloud content server 374 using a secure protocol when the aircraft 8 is within range of the cellular network 376.

Each server 320 may store the same content. Content downloaded wirelessly from the content loader device 370 or the cellular network 376 to one of the servers 320 may be distributed to the other servers 320 via the wireless mesh network in order to synchronise the content across all of the servers 320. This may be particularly advantageous when it is necessary to download or update the content in a short period of time, for example during a turnaround between flights.

In most aircraft deployment scenarios there will be several servers 320 in the cabin 6. The servers 320 may form a cluster to collectively download the content. Each server 320 may download the next content file in a queue of content files until all content files are downloaded to the cluster. The content files are then shared between the servers 320 in the cabin 6 until all the servers 320 have received the downloaded content files. This allows for faster downloads as it avoids any requirement to download the same content files to all the servers 320 in the same aircraft 8.

As described above, one or more of the servers 320 can receive content updates by insertion of physical media or over a network connection. The network connection may be achieved using wired Ethernet, Wi-Fi (802.11), or by 3G/4G/LTE cellular modem connection. These connections have varying speeds and associated transport costs. 3G/4G/LTE cellular traffic typically has a cost per megabyte, whereas a broadband Ethernet or Wi-Fi connection is a fixed cost. This creates a problem in that there may be content items that are to be sent to one or more of the servers 320 in the field, but will incur a large cost if sent by the cellular modem 346. To resolve this, the processor 330 implements a routing policy whereby content items (files, data, images etc) or classes of content or data (e.g. movies, TV, magazines, newspapers) can have a policy applied which determines the permissible transport routes for that item or class of item. For instance, a movie item is a large file that changes infrequently and is reserved for physical transport distribution. A weekly news show is a large file that changes weekly, and is permitted for wireless update to one or more of the servers 320. A daily newspaper is a smaller file that changes daily, and is permitted for cellular update to one or more of the servers 320.

Where large content files are downloaded over a slow communication link, the transfer time may exceed the length of time for which the communication link is available. For example, this may occur when the system is in range of a wireless connection only while the aircraft 8 is located at a gate during a turnaround period between flights. In such a case, the system 302 may pause the transfer when the communication link is lost, and then resume the transfer from that point, when the communication link is re-established.

Figure 8:
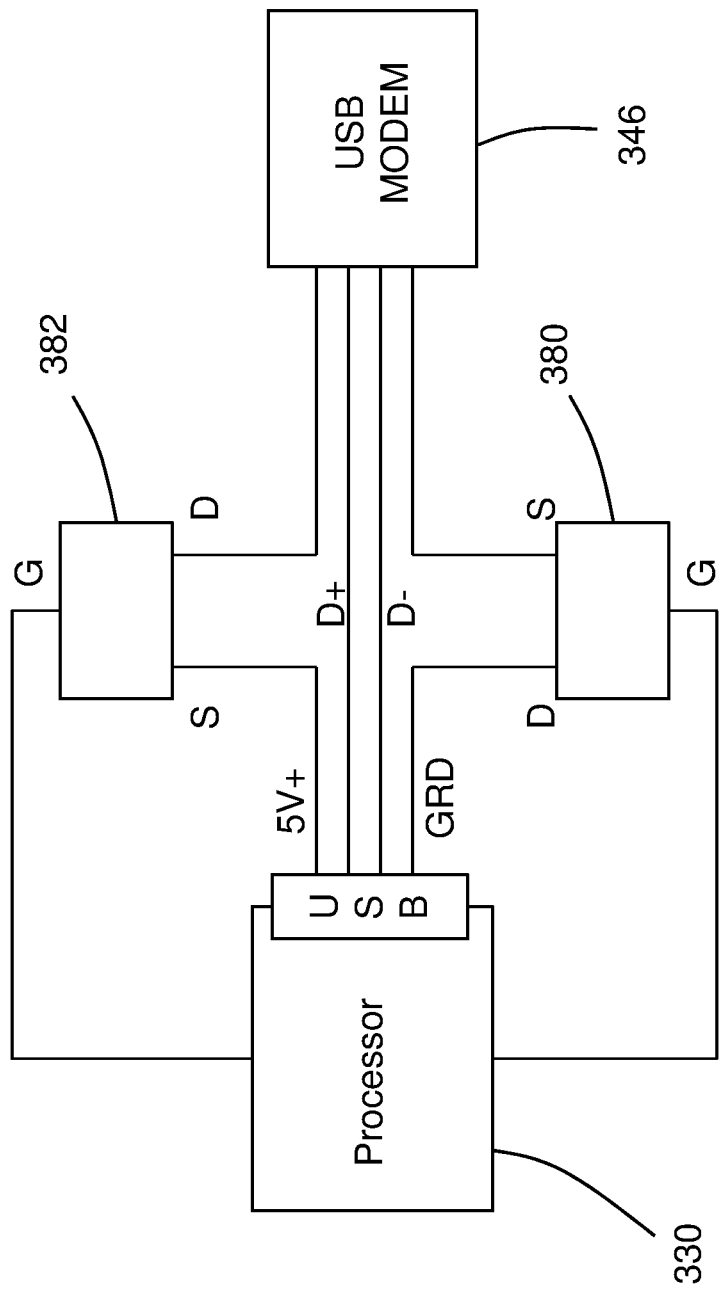
FIG. 8 is a schematic of the power connections between a processor and a USB cellular modem of a server of the first alternative system of FIG. 6.

As shown in FIG. 8, the server 320a may comprise a 5V USB power connection between the processor 330 and the cellular modem 346. The 5V USB power connection may comprise a +5V line and a ground line. The ground line may have an inline switch such as a first inline MOSFET 380. The inline switch may control current flow on the ground line. The processor 330 may use a GPIO pin output to control the power to the cellular modem 346. The GPIO may provide a voltage to a control terminal of the inline switch e.g. a positive voltage on a gate pin designated "G" of the first inline MOSFET 380. This may allow current to flow through the inline switch e.g. from source designated "S" to the drain designated "D" of the first inline MOSFET 380 to enable the cellular modem 346. An equivalent arrangement involving a second inline MOSFET 382 may be used on the +5V line. The use of two such arrangements may provide redundancy to ensure that in certain failure conditions the cellular modem 346 will not activate while uncommanded, e.g. where there is a short-circuit that enables an alternative circuit or ground, bypassing the ground line inline MOSFET 380.

When the cellular modem 346 is active, one or more of the servers 320 can determine Local Area Code and Cell ID of the local cell tower. The processor 330 of may use this information to lookup geolocation information for the server 320 to give an approximate location, without GPS.

Figure 9:
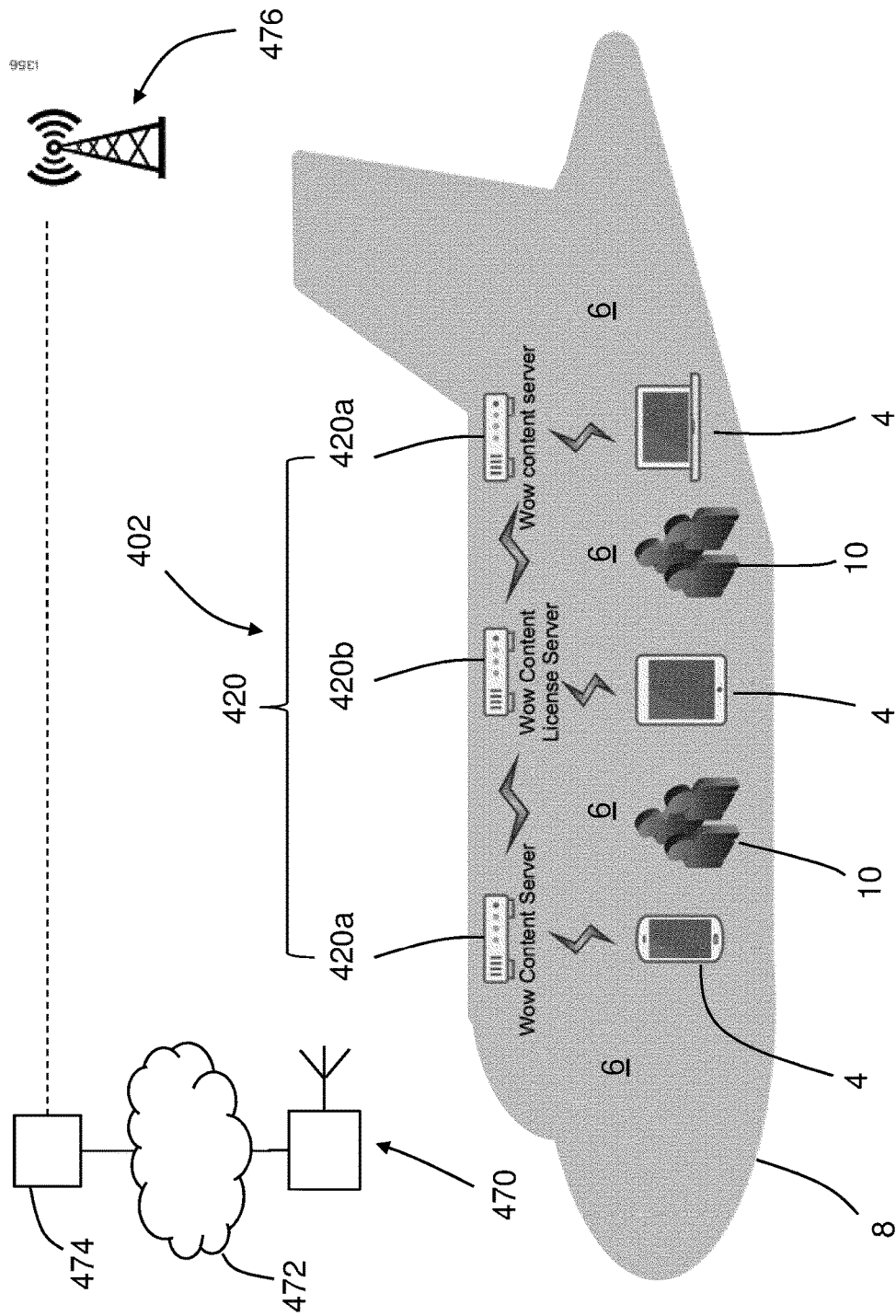
FIG. 9 is a schematic of a second alternative system for wirelessly distributing content including advertising content to a plurality of clients in a cabin of an aircraft.

FIG. 9 shows a further alternative system 402 for wirelessly distributing content including advertising content to a plurality of clients in the form of a plurality of mobile devices 4 in a local area in the form of a cabin 6 of an aircraft 8. As will be described in more detail below, the further alternative system 402 is also configured for collecting user data such as user viewing data, user click-through data, user names, user contact details and the like from the plurality of mobile devices 4. The further alternative system 402 of FIG. 9 includes many like features to the alternative system 302 described with reference to FIGS. 6 to 8 with the features of the further alternative system 402 of FIG. 9 being identified with the same reference numerals as the corresponding features of the alternative system 302 of FIGS. 6 to 8 incremented by "100". Specifically, the further alternative system 402 includes a plurality of portable servers 420, in the form of a plurality of portable content servers 420a and one or more portable content and Digital Rights Management (DRM) licence servers 420b. Each portable server 420 is arranged around the cabin 6 of the aircraft 8 for wireless communication with one or more corresponding mobile devices 4. Each portable server 420 is also arranged around the cabin 6 so as to permit wireless communication with at least one of the other portable servers 420 so that, on power up of the portable servers 420, the portable servers 420 together form a wireless mesh network within the cabin 6.

Figure 10:
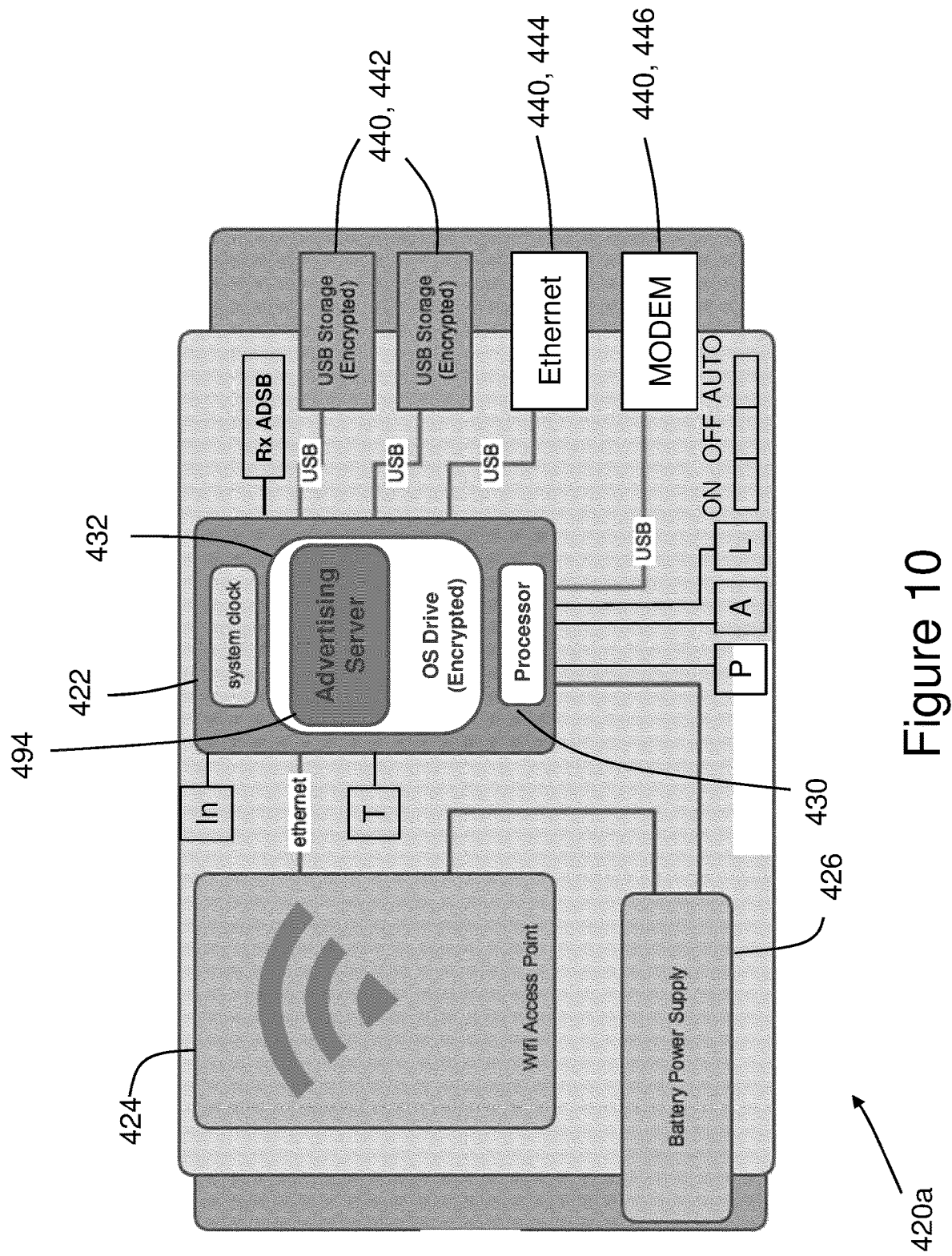
FIG. 10 is a functional block diagram of a portable content server of the second alternative system of FIG. 9.

As shown in FIG. 10, each portable content server 420a includes many like features to the portable content server 320a described with reference to FIG. 7 with the features of the portable content server 420a of FIG. 10 being identified with the same reference numerals as the corresponding features of the portable content server 320a described with reference to FIG. 7 incremented by "100". Specifically, each portable content server 420a includes a single board computer 422, a wireless transceiver in the form of a Wi-Fi access point 424, and a battery 426 for supplying power to the single board computer 422 and the Wi-Fi access point 424. The single board computer 422 includes a processor 430 and an encrypted operating system drive 432 for storing operating system software. The processor 430 may have a relatively low power consumption for longer battery life. For example, the processor 430 may be an ARM processor. Each portable content server 420a further includes a plurality of USB ports 440. Each portable content server 420a includes encrypted USB storage devices 442 connected to two of the USB ports 440. Each portable content server 420a includes a USB wired Ethernet network adapter 444 connected to one of the USB ports 440. Each portable content server 420a also includes a USB cellular MODEM 446 such as a USB 3G/4G/LTE adapter connected to one of the USB ports 440.

However, unlike the portable content server 320a described with reference to FIG. 7, the portable content server 420a of FIG. 10 includes advertising server software 494 installed on the encrypted operating system drive 432 of the portable content server 420a so that the portable content server 420a may function as an advertising server as will be described in more detail below.

One of ordinary skill in the art will understand that the portable content and Digital Rights Management (DRM) licence server 420b may include many features which correspond to the features of the portable content server 420a described herein with reference to FIG. 10. The content and DRM licence server 420b may include DRM licence software installed on an encrypted operating system drive of the content and DRM licence server 420b. The content and DRM licence server 420b may include a processor selected according to its ability to support the DRM license server software. For example, the content and DRM licence server 420b may include an Intel processor. In use, one or more of the servers 420a, 420b may download content by simply replacing one or more of the portable USB storage devices 442 in a manner identical to that already described with reference to the system 2 with reference to FIGS. 1 to 5. With reference to FIG. 9, content may be downloaded and/or updated to the portable USB storage devices 442 by connecting the portable USB storage devices 442 to a content loader device 470 which may be provided to the operator of the system 402 (e.g. the airline or the airport operator). The content loader device 470 may be portable. The content loader device 470 may be located outside, for example remotely from, the local area 6 defined by the aircraft 8. The content loader device 470 may, for example, be located at or near a gate at an airport. The content loader device 470 may be connected via the internet 472 to one or more cloud content servers 474. The content loader device 470 authenticates to the one or more cloud content servers 474 and securely retrieves encrypted content from the one or more cloud content servers 474 via the internet 472, for example using an SSL protected web protocol.

Additionally or alternatively, content may be downloaded and/or updated to one or more of the servers 420a, 420b by connecting one or more of the servers 420a, 420b to the content loader device 470 using a wired connection via the wired Ethernet adapter 444. For example, the content loader device 470 may be carried onto the aircraft 8 and connected to one or more of the servers 420a, 420b, or one or more of the servers 420a, 420b may be carried off the aircraft 8 and connected to the content loader device 470.

Additionally or alternatively, the Wi-Fi access point 424 of one or more of the servers 420a, 420b may be used to communicate wirelessly with the content loader device 470 for the purposes of downloading and/or updating content wirelessly to one or more of the servers 420a, 420b.

Additionally or alternatively, when the cellular modem 446 is enabled, the cellular modem 446 of one or more of the servers 420a, 420b may connect to the cloud content server 474 via a cellular network 476 to download content items and/or updates. One or more of the servers 420a, 420b may authenticate to the cloud content server 474 via the cellular network 476. One or more of the servers 420a, 420b may securely download encrypted content items from the cloud content server 474 using a secure protocol when the aircraft 8 is within range of the cellular network 476.

The portable servers 420a, 420b together define a portable system 402 for wirelessly distributing advertising content to the plurality of clients in the cabin 6. Each portable server 420a, 420b is configured for wireless communication with one or more corresponding clients 4 so that the portable system 402 may distribute advertising content to the plurality of clients 4 in the cabin 6.

The portable system 402 is configured for occasional connection to the internet.

The portable system 402 is configured to deliver advertising content to the plurality of clients 4 when the portable system 402 has no connection, or no access, to the internet. The portable system 402 is configured to allow the advertising content to be updated and/or changed when the portable system 402 has a connection, or access, to the internet.

As described above, one or more of the portable servers 420a, 420b may function as an advertising server. One or more of the portable servers 420a, 420b may function as an advertising server when the portable server 420a, 420b is not connected to the internet, for example, when in flight. Such advertising server functionality may be compliant with current web advertising standards, but will function in a distributed and offline model, where one or more of the portable servers 420*a*, 420*b* act as nodes which communicate with one or more clients 4 offline, but where one or more of the portable servers 420*a*, 420*b* send data back to a master server provided with the cloud content server 474 when one or more of the portable servers 420*a*, 420*b* get online. The master server collates the data received from one or more of the portable servers 420*a*, 420*b* to present a unified view of the received data to mirror behaviour of an online system.

One or more of the portable servers 420*a*, 420*b* may be configured for occasional communication with an advertising admin portal provided with the content loader device 470 and/or the cloud content server 474. The advertising admin portal may be a hosted service.

One or more of the portable servers 420*a*, 420*b* may be configured for communication with the advertising admin portal when a connection is available, for example via a portable storage device 442, via a wired connection such as a wired Ethernet connection, and/or via a wireless connection such as a Wi-Fi (802.11) or a 3G/4G cellular modem connection.

One or more of the portable servers 420*a*, 420*b* may be configured for communication with the advertising admin portal to receive updates, advertising creatives, images, video, HTML and other advertising content, campaign details and/or dates etc.

One or more of the portable servers 420*a*, 420*b* may be configured for communication with one or more of the clients 4 to provide advertising content to one or more of the clients 4. For example, one or more of the portable servers 420*a*, 420*b* may be configured for communication with one or more of the clients 4 so that one or more of the clients 4 display one or more banner advertising images or banner adverts. One or more of the clients 4 may be configured to display a web page when a corresponding user 10 clicks on a banner advert.

One or more of the portable servers 420*a*, 420*b* may be configured to communicate video adverts to one or more of the clients 4 for display to the one or more corresponding users 10 before, during and/or after each user 10 views an item of video content e.g. a movie or a TV show.

One or more of the portable servers 420*a*, 420*b* may be configured to collect user data from the clients 4.

One or more of the portable servers 420*a*, 420*b* may be configured to collect from the clients 4, the number of users 10 that have seen an advert such as a banner advert or a video advert and the number of user "click-throughs".

One or more of the portable servers 420*a*, 420*b* may be configured to collect user names, user contact details such as user email addresses and the like.

One or more of the portable servers 420*a*, 420*b* may be configured to connect to the advertising admin portal when a connection is available to upload user data such as user view and click-through data, user names, user contact details and any other user data collected during the period when the portable server was not connected to the advertising admin portal. This way, the system 402 may allow online configuration of advertising campaigns, and the portable servers 420*a*, 420*b* will sync with the advertising admin portal whenever the portable servers 420*a*, 420*b* are online, but will cache the campaign data when they are offline to enable the system 402 to function when no connection is available e.g. when inflight.

The advertising admin portal may collect data from all the portable servers 420*a*, 420*b* when they connect to the advertising admin portal. The advertising admin portal may then collate the collected data to allow campaign information and statistics to be made available to the portal users e.g. the number of portable servers, aircraft, and flights on which an advert was displayed, the number of users that viewed the advert, the number of clicks on the advert, and the click-through percentage rate.

The portable servers 420*a*, 420*b* may be compliant with the VAST (Video Ad Serving Template) specification provided by the Interactive Advertising Bureau (IAB). This enables the portable servers 420*a*, 420*b* to consume and serve the same creative and participate in the same campaigns as standard web advertising e.g. Google ads. As such, the system 402 can comply with these standards, which are designed for an online environment, even though the web advertising is deployed in an offline environment which is only sometimes connected to the internet.

The portable servers 420*a*, 420*b* may be configured to assign a unique client identifier to a client when the client accesses the advertising content for the first time. The portable servers 420*a*, 420*b* may be configured to repeatedly collect data relating to the advertising content accessed by the client. The portable servers 420*a*, 420*b* may be configured to store, in the portable servers 420*a*, 420*b*, the collected data relating to the advertising content accessed by the client together with the unique identifier for the client. The client identifier may exclude any personal information which could be used to identify a specific user of a client device. For example, the client identifier may exclude a name of the specific user of the client device, the client identifier may exclude contact details of the specific user of the client device and/or the client identifier may exclude an email address of the specific user of the client device. The portable servers 420*a*, 420*b* may store the client identifier on the client device, for example as a persistent cookie on a browser of the client device. The portable servers 420*a*, 420*b* may store the client identifier in application data on a mobile client device such as a mobile client device which uses an Android operating system or a mobile client device which uses an iOS operating system.

Figure 11:
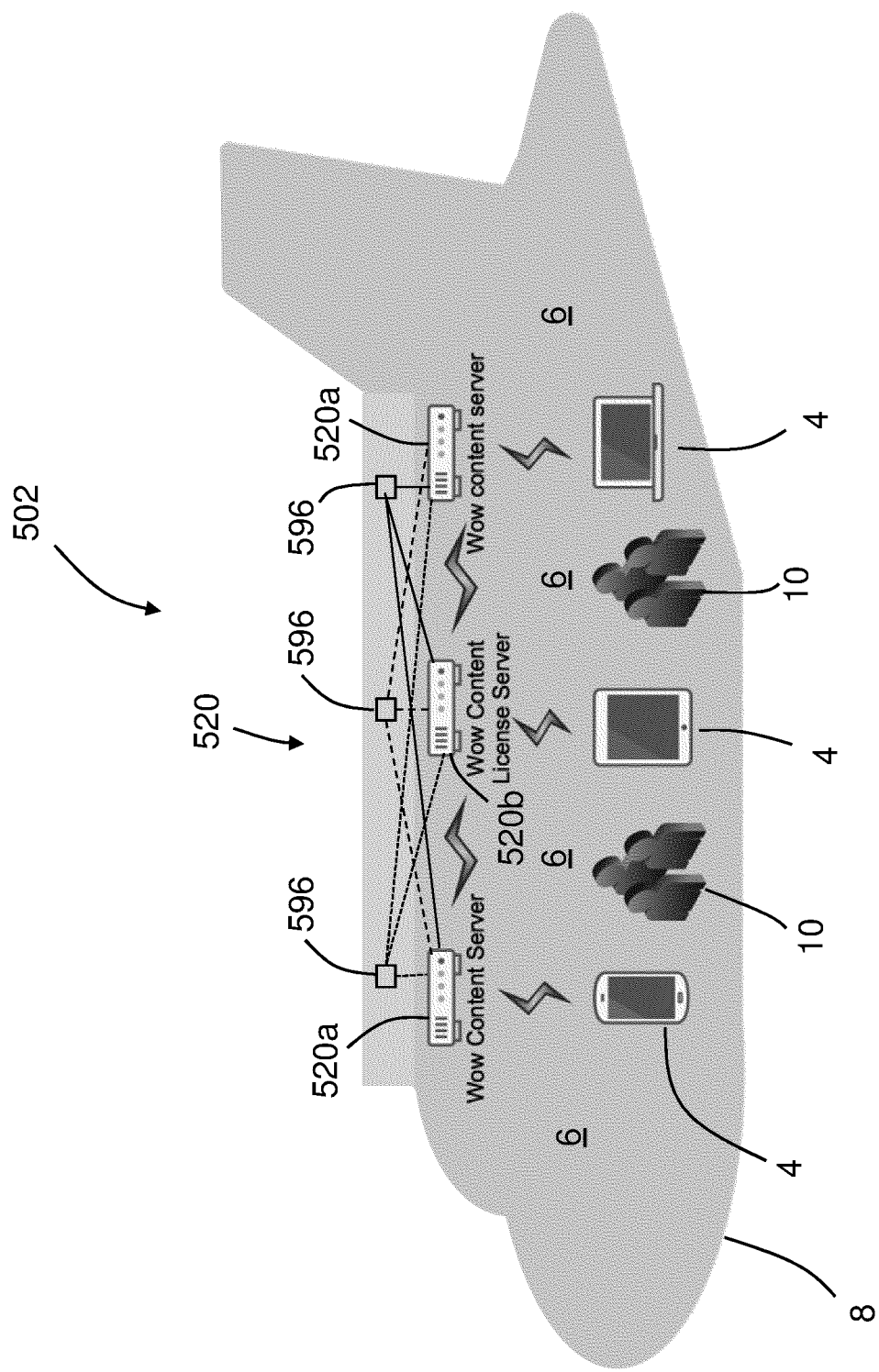
FIG. 11 is a schematic of a third alternative system for wirelessly distributing content to a plurality of clients in a cabin of an aircraft.

Referring to FIG. 11 there is shown a third alternative portable system generally designated 502 for wirelessly distributing content to a plurality of clients in the form of a plurality of mobile devices 4 in a local area in the form of a cabin 6 of an aircraft 8. Each mobile device 4 may be operated by a corresponding user 10. The portable system 502 may be configured to deliver content to the mobile devices 4 without any requirement for the portable system 502 to be connected to, or to have access to, the internet.

The portable system 502 includes a plurality of portable servers 520 in the form of a plurality of portable content servers 520*a* and one or more portable content and Digital Rights Management (DRM) licence servers 520*b*. Each portable server 520 is arranged around the cabin 6 for wireless communication with one or more corresponding mobile devices 4. Each portable server 520 is also arranged around the cabin 6 so as to permit wireless communication with at least one of the other portable servers 520 so that, on power up of the portable servers 520, the portable servers 520 together form a wireless mesh network within the cabin 6.

Each mobile device 4 may a portable computing device which includes software such as a compatible browser or an app to permit the user 10 to communicate with, and select content stored on, any one of the portable servers 520 to permit the user 10 to view and/or listen to the content via the mobile device 4. For example, each mobile device 4 may be a smart phone, a tablet or a laptop. Each mobile device 4 may comprise an Apple iOS device, an Android device, an Apple MacBook and/or a laptop running Windows or Linux, and/or a device with an HTML5 compliant browser. The software may be installed on the corresponding mobile device 4 in advance of boarding the aircraft 8.

Each mobile device 4 may be carried onto the aircraft 8 by the corresponding user 10 before a flight and carried off the aircraft 8 by the corresponding user 10 after the flight. The portable system 2 does not require any dedicated or fixed client devices to be provided or to be permanently installed in the aircraft 8 for each user 10 to permit each user 10 to select, view and/or listen to content. The system 2 is designed for use in a Bring Your Own Device (BYOD) model. The BYOD model allows users 10 to use their own compatible mobile devices 4 to access the system 2: iOS, Android, PC or Mac.

Figure 12:
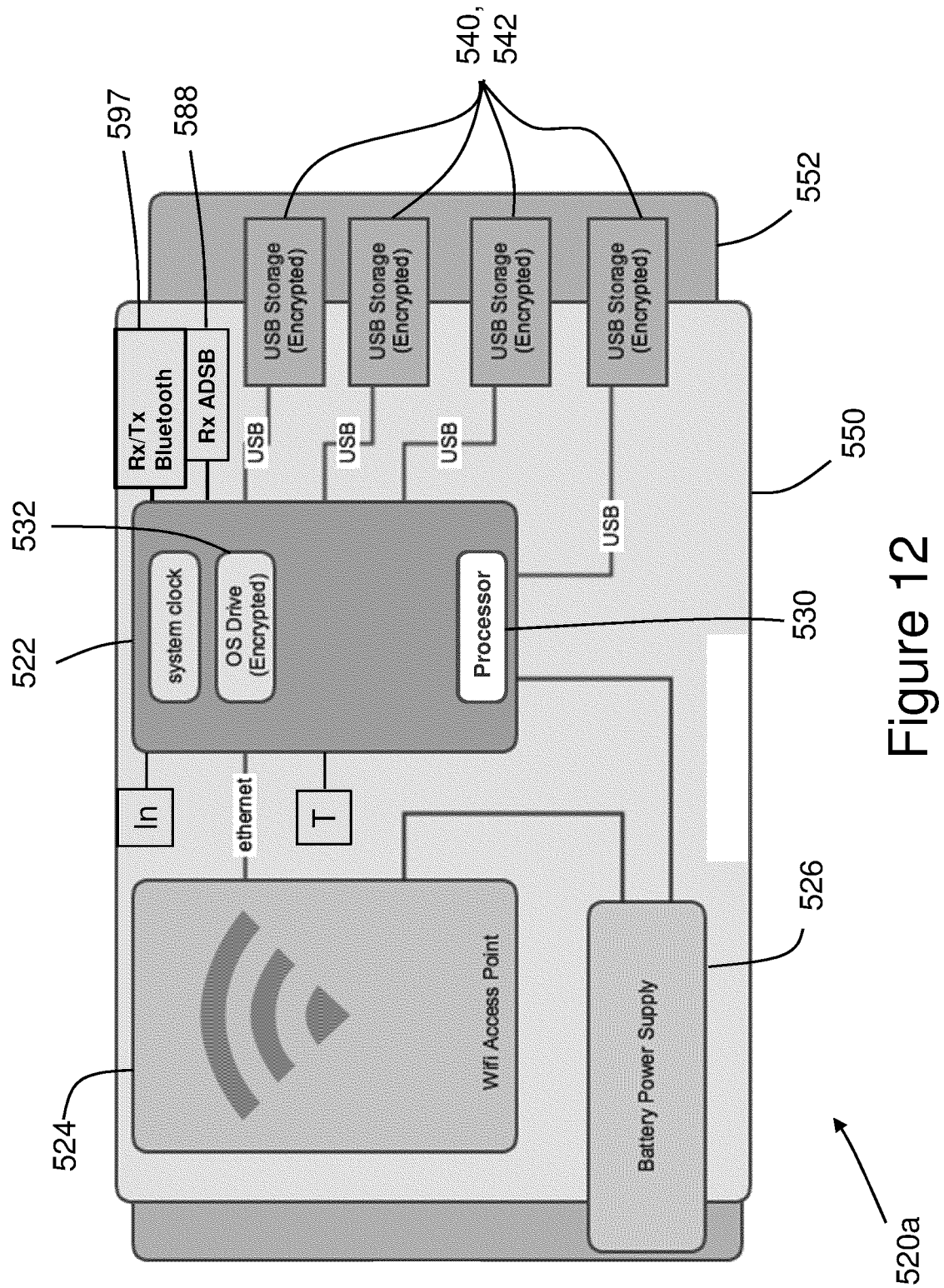
FIG. 12 is a functional block diagram of an alternative portable content server for use in the system of FIG. 11.

As shown in FIG. 12, each portable content server 520*a* includes a single board computer 522, a wireless content transceiver in the form of a Wi-Fi access point 524 and a battery 526 for supplying power to the single board computer 522 and the Wi-Fi access point 524. The single board computer 522 includes a processor 530 and an encrypted operating system drive 532 for storing operating system software. The processor 530 may have a relatively low power consumption for longer battery life. For example, the processor 530 may be an ARM processor. Each portable content server 520*a* further includes a plurality of USB ports 540, each USB port 540 being configured to receive a corresponding encrypted USB storage device 542 such as an SD card. Each of the USB storage devices 542 may be encrypted with LUKS using an aes-xts cipher with a 256-bit key.

One of ordinary skill in the art will understand that the portable content and Digital Rights Management (DRM) licence server 520*b* may include many features which correspond to the features of the portable content server 520*a* described herein with reference to FIG. 12. The content and DRM licence server 520*b* may include DRM licence software installed on an encrypted operating system drive of the content and DRM licence server 520*b*. The content and DRM licence server 520*b* may include a processor selected according to its ability to support the DRM license server software. For example, the content and DRM licence server 520*b* may include an Intel processor.

The system may also be capable of receiving information or data which is transmitted or broadcast from the aircraft 8, for example from one or more of the aircraft systems.

One or more of the servers 520*a*, 520*b* may provide "moving map" information. This may allow a user 10 to view a map showing the current position of the aircraft 8 and other journey information (e.g. flight information such as altitude, ETA etc.). To facilitate this, one or more of the servers 520*a*, 520*b* may include a UHF radio receiver 588 to monitor for position broadcasts sent by the aircraft 8 for air traffic control purposes. These are known as ADS-B-out (Automatic Dependent Surveillance-Broadcast out) transmissions. The messages may contain position, ICAO callsign (hex), altitude, flight number, and other data. The processor 530 may parse the received position broadcasts to determine current flight information for display on a moving map at the one or more clients 4.

Monitoring position broadcasts sent by the aircraft 8 may avoid any requirement to modify the aircraft systems. In addition, monitoring position broadcasts sent by the aircraft 8 in this way does not require any of the servers 520*a*, 520*b* to be compatible with any particular type of aircraft system. Monitoring position broadcasts sent by the aircraft 8 in this way does not require any of the servers 520*a*, 520*b* to transmit, write or send commands to an aircraft system. Consequently, the servers 520*a*, 520*b* are not capable of transmitting, writing or sending commands to the aircraft system and are not, therefore, capable of controlling an aircraft system. Also, monitoring position broadcasts sent by the aircraft 8 in this way may avoid any requirement to use a GPS receiver located inside one or more of the servers 520*a*, 520*b*. This may be advantageous because a GPS receiver located inside a server 520*a*, 520*b* may not receive sufficient signal to establish a fix.

The ADS-B is a broadcast signal and messages may be received by one or more of the servers 520*a*, 520*b* via the UHF radio receiver 588 from other aircraft in the vicinity of the aircraft 8. It is desirable that each server 520*a*, 520*b* is able to determine its installation aircraft and location, to allow the server 520*a*, 520*b* to determine the ADS-B signal and messages broadcast by the particular aircraft within which the servers 520*a*, 520*b* are mounted and to filter out ADS-B signals and messages broadcast by other nearby aircraft. Accordingly, as shown in FIG. 12, each server 520*a*, 520*b* includes a wireless communication device in the form of a Bluetooth transceiver 597 and, as shown in FIG. 11, the portable system 502 includes a plurality of further wireless communication devices in the form of a plurality of Bluetooth beacons 596, each Bluetooth beacon 596 mounted to the aircraft 8 adjacent to a corresponding server 520*a*, 520*b*. Specifically, when a server 520*a*, 520*b* is installed in the aircraft 8, it may be mounted in an overhead bin, in a galley stowage location, mounted to a bulkhead, or any suitable location in the cabin 6. Each Bluetooth beacon 596 may use BLE, iBeacon, Eddystone or another Bluetooth technology. Each Bluetooth beacon 596 comprises a Bluetooth module and radio, a processor, storage, an antenna and a battery (not shown). Each Bluetooth beacon 596 stores portable server location data in the form or a unique identifier for the aircraft 8, a unique identifier for an airline which operates the aircraft 8, the mount location of the Bluetooth beacon 596 within the cabin 6, and/or other custom portable server location data, including a Transmit Power (TxPwr) setting of the Bluetooth beacon 596. Each Bluetooth beacon 596 stores an identifier to identify it as a Bluetooth beacon associated with the system 502. Each Bluetooth beacon 596 may have a power switch (not shown) to switch the Bluetooth beacon 596 on or off. Each Bluetooth beacon 596 is lightweight and is suitable to be attached to a surface of the aircraft 8 by velcro, glue, screws, brackets and/or other fixing arrangements. Each Bluetooth beacon 596 has a small form factor. For example, each Bluetooth beacon 596 may be approximately 50 mm×50 mm×30 mm in size, although each Bluetooth beacon 596 may have a form factor which is larger or smaller than this.

In use, each Bluetooth beacon 596 broadcasts portable server location data at a regular intervals, e.g. every 10 seconds. Each Bluetooth beacon 596 broadcasts continually while it is powered. The broadcast portable server location data may be encrypted with a shared key or public key. Each server 520*a*, 520*b* monitors for, and identifies, portable server location data broadcast from the Bluetooth beacons 596 associated with the system 502. Each server 520*a*, 520*b* detects and receives portable server location data from all nearby Bluetooth beacons 596. Each server 520*a*, 520*b* decodes and stores the portable server location data broadcast by the Bluetooth beacons 596.

Each server 520*a*, 520*b* records the received signal strength (RSS) from each Bluetooth beacon 596. Each server 520*a*, 520*b* uses the RSS of each Bluetooth beacon 596 and the transmitted Transmit Power (TxPwr) setting of each Bluetooth beacon 596 to determine the approximate distance of the Bluetooth beacon 596 from the server 520a, 520b. Each server 520a, 520b uses the relative distances from the server 520a, 520b to each Bluetooth beacon 596 to determine its own location relative to the Bluetooth beacons 596, and to determine which is the most likely mount location of the server 520a, 520b within the cabin 6 based on known locations of the different Bluetooth beacons 596 within the cabin 6.

Each server 520a, 520b uses the portable server location data broadcast to identify the airline, aircraft and location of each Bluetooth beacon 596. Each server 520a, 520b reports or records the mount location, aircraft and airline in its data logs. Each server 520a, 520b uses the unique aircraft identifier from the Bluetooth beacons 596 to filter received ADSB location information broadcast. This is a more reliable strategy to determine which aircraft the server 520a, 520b is installed in.

One of skill in the art will understand that, although it would be possible in principle to mount Wi-Fi beacons within the cabin 6 of the aircraft 8 to broadcast data to the Wi-Fi access point 524 of each server 520a, 520b using a Wi-Fi wireless communication standard or protocol, the use of lower data rate Bluetooth beacons 596 to broadcast data to the Bluetooth transceiver 597 of each server 520a, 520b using a Bluetooth wireless communication standard or protocol, consumes less power.

Each server 520a, 520b may broadcast a Bluetooth signal to advertise its presence to other servers 520a, 520b located within the cabin 6 of the aircraft 8. Each server 520a, 520b may compare the number of servers 520a, 520b broadcasting Bluetooth signals in the cabin 6 against the number of servers 520a, 520b known or expected to be located in the cabin 6, and records a warning message if they do not match. This may indicate a faulty or non-functional server 520a, 520b.

Figure 13:
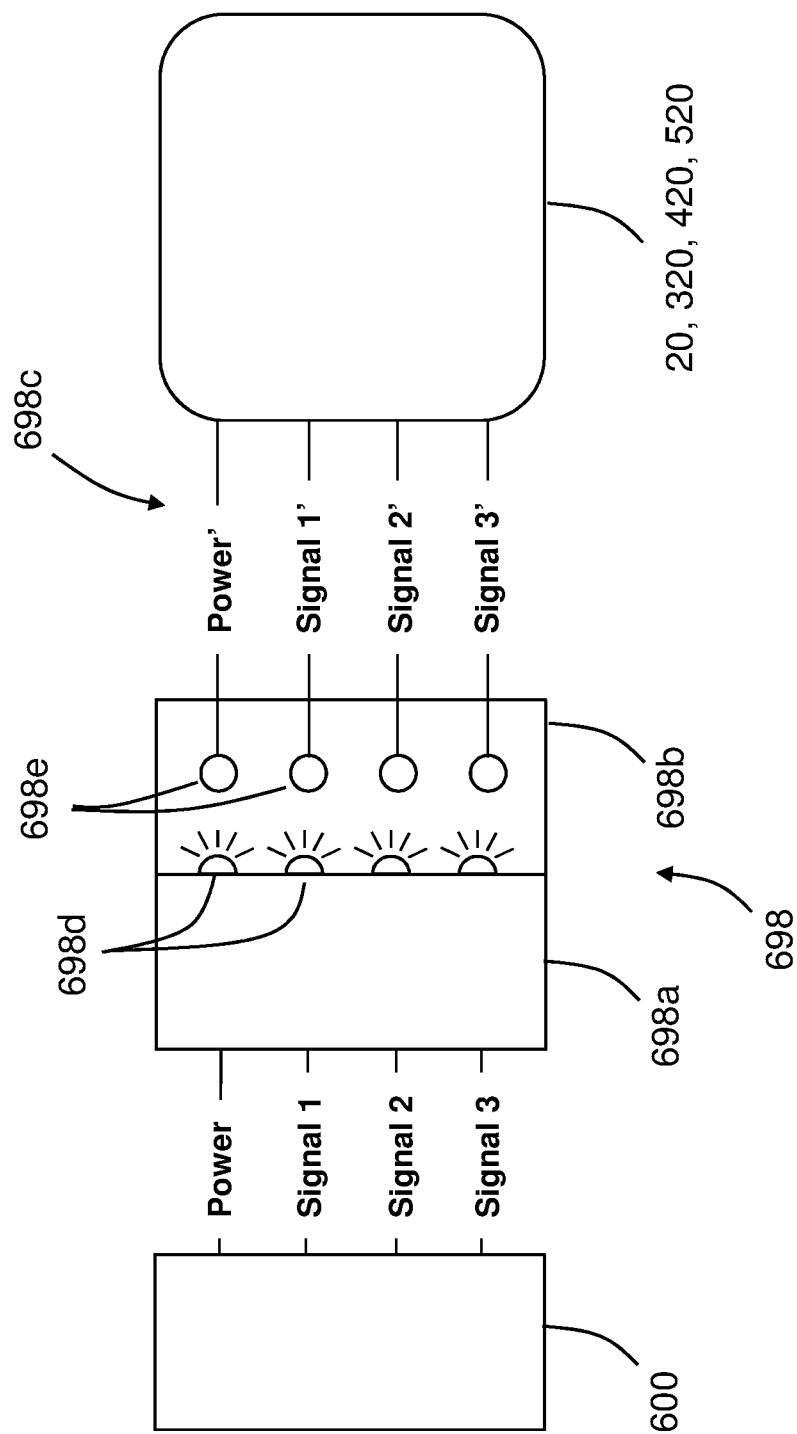
FIG. 13 is a schematic of an optical isolator system when used for electrically isolating a portable server from a system of an aircraft.

Additionally or alternatively, one or more of the servers 520a, 520b may comprise a GPS receiver (not shown). The GPS receiver (not shown) does not receive a signal in the cabin during flight, but may be used on the ground for tracking, so that the system 2 can report its location the next time it has a network connection. Any of the systems 2, 302, 402, 502 may be configured to broadcast information from a system of the aircraft 8 to one or more of the clients 4. Specifically, as shown in FIG. 13, any of the systems 2, 302, 402, 502 may include an optical isolator system generally designated 698 for connecting a system 600 of the aircraft 8 to one or more of the clients 4 via the server 20, 320, 420, 520 for transmitting information from the aircraft system 600 to the one or more of the clients 4 via the server 20, 320, 420, 520.

The optical isolator system 698 includes an electrical-to-optical converter apparatus 698a for receiving input electrical signals "Power", "Signal 1", "Signal 2" and "Signal 3" from the aircraft system 600 and for converting each of the input electrical signals "Power", "Signal 1", "Signal 2" and "Signal 3" into a corresponding optical signal which is representative of the corresponding input electrical signal. "Signal 1", "Signal 2" and "Signal 3" may, for example, be representative of aircraft state signals, such as whether the aircraft is airborne (weight on wheels) or whether an engine is running, or whether a door is open, or whether a cabin announcement is in progress. The electrical-to-optical converter apparatus 698a may be configured to be connected with, fitted, and/or attached to the aircraft system 600.

The optical isolator system 698 further includes an optical-to-electrical converter apparatus 698b for receiving the optical signals from the electrical-to-optical converter apparatus 698a, for converting the received optical signals into output electrical signals "Power'", "Signal 1'", "Signal 2'" and "Signal 3'" which are representative of the received optical signals, and for transmitting the output electrical signals "Power'", "Signal 1'", "Signal 2'" and "Signal 3'" to the portable server 20, 320, 420, 520. The optical isolator system 698 further includes a cable 698c for attachment of the optical-to-electrical converter apparatus 698b to the portable server 20, 320, 420, 520.

The electrical-to-optical converter apparatus 698a includes a plurality of electrical input signal terminals, each electrical input signal terminal configured to receive a corresponding one of the input electrical signals "Power", "Signal 1", "Signal 2" and "Signal 3" from the aircraft system 600. The electrical-to-optical converter apparatus 698a includes a plurality of light sources in the form of a plurality of LEDs 698d. Each LED 698d independently illuminates to show the state of the corresponding input electrical signal "Power", "Signal 1", "Signal 2" and "Signal 3" from the aircraft system 600. One of skill in the art will understand that, in an alternative embodiment of the electrical-to-optical converter apparatus 698a, light sources other than LEDs may be used, for example laser diodes.

The optical-to-electrical converter apparatus 698b includes a plurality of electrical output signal terminals, each electrical output signal terminal connected to a corresponding electrical conductor of the cable 698c for transmission of a corresponding one of the output electrical signals "Power'", "Signal 1'", "Signal 2'" and "Signal 3'" to the portable server 20, 320, 420, 520. The optical-to-electrical converter apparatus 698b includes a plurality of light sensors in the form of a plurality of photodiodes 698e. Each photodiode 698e is connected electrically to a corresponding one of the electrical output signal terminals. Each photodiode 698e is aligned with a corresponding LED 698d of the electrical-to-optical converter apparatus 698a. One of skill in the art will understand that, in an alternative embodiment of the optical-to-electrical converter apparatus 698b, light sensors other than photodiodes may be used, for example phototransistors and/or light dependent resistors (LDRs). Each photodiode 698e detects the state of the corresponding LED 698d, on or off. Each photodiode 698e is capable of detecting a change of state of the corresponding LED 698d within 1 microsecond. Each photodiode 698e can be set to detect a configurable light level as a "high" or "on" signal state. Each photodiode 698e can be set to detect a configurable light level as a "low" or "off" signal state. Each photodiode 698e has a range between the "high" and "low" state thresholds in which the signal state does not switch. The state of each of the output electrical signals "Power'", "Signal 1'", "Signal 2'" and "Signal 3'" is indicated through an electrical connection to the portable server 20, 320, 420, 520 provided by the cable 698c. The processor 30, 130, 330, 430, 530 of the portable server 20, 320, 420, 520 may act on the output electrical signals "Power'", "Signal 1'", "Signal 2'" and "Signal 3'" to perform logic operations.

The electrical-to-optical converter apparatus 698a includes a 'Power' LED which is always on when the electrical-to-optical converter apparatus 698a is energised. The portable server 20, 320, 420, 520 may use the state of the corresponding output electrical signal "Power'" to detect if the electrical-to-optical converter apparatus 698a is energised, and if the optical-to-electrical converter apparatus 698*b* and the cable 698*c* are connected between the electrical-to-optical converter apparatus 698*a* and the portable server 20, 320, 420, 520.

The LEDs 698*d* and photodiodes 698*e* may be configured to emit and detect a particular wavelength of visible or non-visible light, e.g. infra-red, or blue light. Each LED/photodiode pair may be configured to use a different colour or wavelength of light. This may be used to ensure that misalignment between the electrical-to-optical converter apparatus 698*a* and the optical-to-electrical converter apparatus 698*b* would not give erroneous indications. The electrical-to-optical converter apparatus 698*a* and the optical-to-electrical converter apparatus 698*b* may have one or more complementary inter-engaging features such as a physical key mould to ensure that the electrical-to-optical converter apparatus 698*a* and the optical-to-electrical converter apparatus 698*b* are correctly aligned and/or orientated when connected to one another. As will be described in more detail below, the optical-to-electrical converter apparatus 698*b* is easily removable from the electrical-to-optical converter apparatus 698*a* without tools.

The optical isolator system 698 can be connected to a serial data input signal from the aircraft, such as ARINC 429 Data Bus. In use, the optical isolator system 698 converts the high/low state of the input electrical signals "Power", "Signal 1", "Signal 2" and "Signal 3" into corresponding high/low optical signals. The LEDs 698*d* are capable of switching from on to off or off to on within 1 microsecond.

The purpose of using the optical isolator system 698 rather than a more traditional electrical connection is to maintain an air gap separation between the portable server 20, 320, 420, 520 and the aircraft system 600 and thereby prevent the transmission of any electrical signals from the portable server 20, 320, 420, 520 to the aircraft system 600. In effect, this means that the portable servers 20, 320, 420, 520 may be treated as portable equipment under many aircraft regulations.

The electrical-to-optical converter apparatus 698*a* may be an aircraft installed component. The electrical-to-optical converter apparatus 698*a* may include power and data connections to the aircraft system 600. The data connections may allow transmission of keyline discrete signals (per ARINC 763-3 specification) indicating a true/false high/low/on/off state. Additionally or alternatively, the data connections may be configured according to ARINC 429 and 629 specifications for data bus interfaces for carrying serial digital data signals.

In use, the optical isolator system 698 may receive input electrical signals in the form of any aircraft keyline signal including Weight-on-Wheels, Door Closed, Parking Brake and PA PTT. The optical isolator system 698 may enable the transmission of additional data to the portable servers 20, 320, 420, 520 through the optical isolator system 698. The optical isolator system 698 may receive inputs from any ARINC 429 compatible aircraft serial data bus, such as a flight management computer or an air data computer.

For example, one or more of the electrical signals "Signal 1", "Signal 2" and "Signal 3" from the aircraft system 600 may indicate when a cabin announcement is in progress. For example, one or more of the electrical signals may be a keyline discrete signal commonly called the PA PTT (Passenger Announcement Push-To-Talk). In use, the processor 30, 130, 330, 430, 530 of the portable server 20, 320, 420, 520 monitors the output electrical signals, "Signal 1'", "Signal 2'" and "Signal 3'" received from the aircraft system 600 via the optical isolator system 698 and determines when an announcement is in progress during a flight. When the processor 30, 130, 330, 430, 530 determines that an announcement is in progress, each portable server 20, 320, 420, 520 sends a command to the one or more corresponding clients 4 on the network to pause playback of content and request that the user 10 pays attention to the cabin announcement. When the announcement ends, each portable server 20, 320, 420, 520 then sends a command to the clients 4 in the cabin 6 to resume playback of content.

Figure 14B:
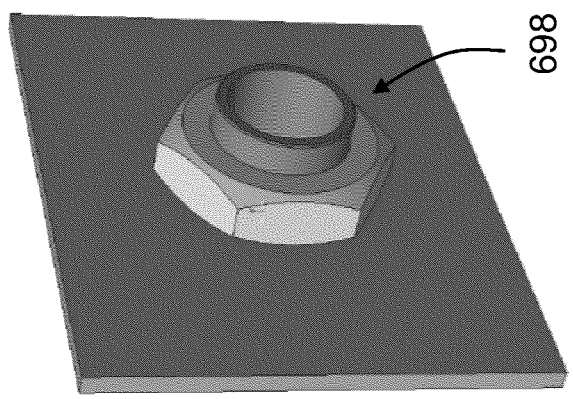
FIG. 14B is a bulkhead-side perspective view of the optical isolator system of FIG. 13.
Figure 14A:
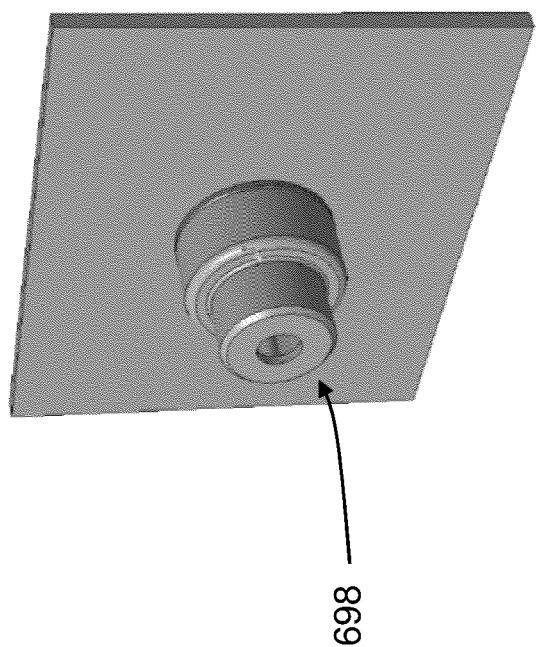
FIG. 14A is a cabin-side perspective view of the optical isolator system of FIG. 13.
Figures 15A, 15B:
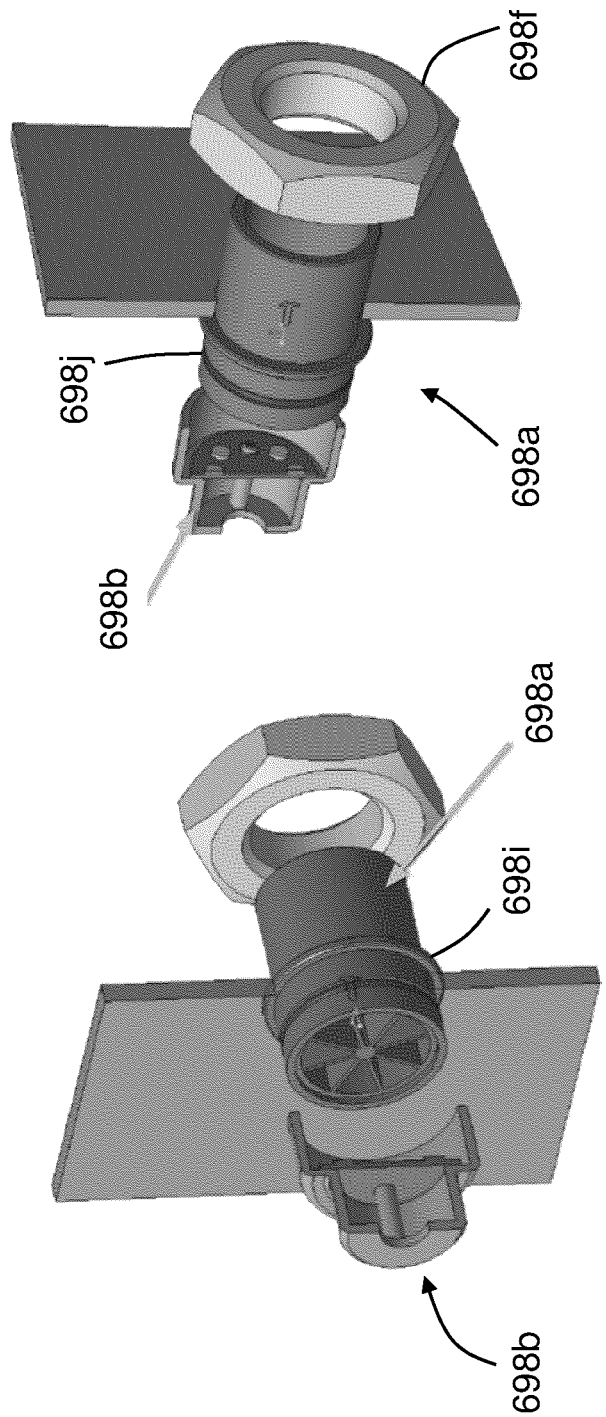
FIG. 15A is a cabin-side exploded view of the optical isolator system of FIG. 13.
FIG. 15B is a bulkhead-side exploded view of the optical isolator system of FIG. 13.

The optical isolator system 698 will now be described in more detail with reference to FIGS. 14A-17C. FIG. 14A is a cabin-side perspective view of the optical isolator system 698 and FIG. 14B is a bulkhead-side perspective view of the optical isolator system 698. FIG. 15A is a cabin-side exploded view of the optical isolator system 698 and FIG. 15B is a bulkhead-side exploded view of the optical isolator system 698 showing the electrical-to-optical converter apparatus 698*a* and the optical-to-electrical converter apparatus 698*b*. As shown in FIGS. 15A and 15B, the optical isolator system 698 further includes a locking nut 698*f* for securing the electrical-to-optical converter apparatus 698*a* to a panel of the aircraft.

As shown in more detail in FIGS. 16A-16E, the electrical-to-optical converter apparatus 698*a* includes a body 698*g* and a PCB 698*h* housed within the body 698*g*. The LED's 698*d* are distributed circumferentially on the PCB 698*h*. The body 698*g* defines a ridge 698*i* on an outer diameter thereof. The electrical-to-optical converter apparatus 698*a* further includes an O-ring 698*j* mounted on an outer diameter of the body 698*g*.

As shown in more detail in FIGS. 17A-17C, the optical-to-electrical converter apparatus 698*b* includes a body 698*k* and a PCB 698*l* housed within the body 698*k*. The photodiodes 698*d* are distributed circumferentially on the PCB 698*l*. As shown in FIGS. 15A and 15B, the body 698*k* defines an inner diameter which is configured to fit over the O-ring 698*j* on the outer diameter of the body 698*g* of the electrical-to-optical converter apparatus 698*a* so as to compress the O-ring 698*j* between the body 698*k* of the optical-to-electrical converter apparatus 698*b* and the body 698*g* of the electrical-to-optical converter apparatus 698*a* and thereby hold the optical-to-electrical converter apparatus 698*b* in place relative to the electrical-to-optical converter apparatus 698*a*.

As shown in FIGS. 16B-16E, the body 698*g* of the electrical-to-optical converter apparatus 698*a*, defines a plurality of radially extending partitions 698*m* internally thereof so as to define a plurality of compartments or chambers 698*n*. When the optical-to-electrical converter apparatus 698*b* is held in place relative to the electrical-to-optical converter apparatus 698*a*, each compartment or chamber 698*n* optically isolates one of the LED's 698*d* and the corresponding photodiode 698*d* from the other LED's 698*d* and photodiodes 698*d* so as to avoid any cross-talk between the output electrical signals "Power'", "Signal 1'", "Signal 2'" and "Signal 3'".

One of ordinary skill in the art will understand that various modifications may be made to the systems 2, 302, 502 described above. For example, rather than each server 520*a*, 520*b* including a wireless communication device in the form of a Bluetooth transceiver 597 and the portable system 502 including a plurality of further wireless communication devices in the form of a plurality of Bluetooth beacons 596, each server 520*a*, 520*b* may include a wireless communication device in the form of a RFID scanner or reader and the portable system 502 may include a plurality of further wireless communication devices in the form of a plurality of RFID tags, each RFID tag mounted to the aircraft 8 adjacent to a corresponding server 520*a*, 520*b*. Specifically, when a server 520*a*, 520*b* is installed in the aircraft 8, it may be mounted in an overhead bin, in a galley stowage location, mounted to a bulkhead, or any suitable location in the cabin 6. Each RFID tag may be passive or active. Each RFID tag stores portable server location data in the form or a unique identifier for the aircraft 8, a unique identifier for an airline which operates the aircraft 8, the mount location of the RFID tag within the cabin 6, and/or other custom portable server location data. Each active RFID tag stores a Transmit Power (TxPwr) setting of the RFID tag. Each RFID tag stores an identifier to identify it as an RFID tag. Each RFID tag may be a short range transmitter tag, or a long range (UHF) tag. The RFID scanner or reader of each server 520*a*, 520*b* is configured with the appropriate radio and antenna for the expected range of the corresponding RFID tag. Each RFID tag will be configured with an identifier to identify it as an RFID tag associated with the system 502. Each RFID tag may have a switch to switch the RFID tag on or off. Each RFID tag may have a small form factor, for example 30 mm×30 mm×10 mm. Each RFID tag may be lightweight, suitable to be attached to a surface of the aircraft 8 by velcro, glue, screws, brackets and/or other fixing arrangements.

In use, the RFID scanner or reader of each server 520*a*, 520*b* scans for RFID tags in the vicinity periodically to identify RFID tags associated with the system 502. Each RFID tag in the vicinity responds to the scan. The RFID scanner or reader of each server 520*a*, 520*b* detects and receives portable server location data from all RFID tags associated with the system 502. Each server 520*a*, 520*b* decodes and stores the portable server location data broadcast by the RFID tags associated with the system 502. Each server 520*a*, 520*b* uses the portable server location data from the RFID tags to identify the airline, aircraft and location of each RFID tag within the cabin 6 of the aircraft 8. Each server 520*a*, 520*b* records the received signal strength (RSS) from each RFID tag. Each server 520*a*, 520*b* uses the RSS of each RFID tag and the transmitted Transmit Power (TxPwr) setting of each RFID tag to determine the approximate distance of the RFID tag from the server 520*a*, 520*b*. Each server 520*a*, 520*b* uses the relative distances to determine its own location relative to the RFID tags, and to determine which is the most likely mount location of the server 520*a*, 520*b* within the cabin 6 based on known locations of the different RFID tags within the cabin 6. Each server 520*a*, 520*b* records or reports the mount location, aircraft and airline in its data logs. Each server 520*a*, 520*b* uses the aircraft identifier from the RFID tag to filter received ADSB location information broadcast. This is a more reliable strategy to determine which aircraft the server 520*a*, 520*b* is installed in.

One of skill in the art will understand that, although it would be possible in principle to mount Wi-Fi beacons within the cabin 6 of the aircraft 8 to broadcast portable server location data to the Wi-Fi access point 524 of each server 520*a*, 520*b* using a Wi-Fi wireless communication standard or protocol, the use of lower data rate RFID tags to broadcast portable server location data to an RFID scanner or reader of each server 520*a*, 520*b* using an RFID wireless communication standard or protocol, consumes less power.

The RFID tag and each server 520*a*, 520*b* may be configured so that the range of the RFID tag requires the server 520*a*, 520*b* to be correctly oriented in close proximity to the RFID tag in order to read the RFID tag or to detect a transmission from the RFID tag.

In use, where the server 520*a*, 520*b* is mounted in a mounting assembly within the aircraft 8, the mounting assembly may contain a short-range RFID tag in a location and orientation such the server 520*a*, 520*b* may read the short-range RFID tag only when correctly mounted and oriented. The system 502 may include an anti-tamper mechanism to prevent the RFID tags from being removed from the aircraft 8 without authorisation. For example, the mounting assembly may include an anti-tamper mechanism to prevent the RFID tags from being removed from the aircraft 8 without authorisation. The anti-tamper mechanism may be configured so as to require a key or a keyed tool to remove the RFID tag from the aircraft 8.

In some instances, where the aircraft system 602 already provides one or more optical signal outputs, use of a separate electrical-to-optical converter apparatus such as the electrical-to-optical converter apparatus 610 shown in FIG. 13 may not be necessary to optically isolate the server 20, 320, 420, 520 from the aircraft system 602 and the optical isolation system 600 may exclude the electrical-to-optical converter apparatus 610.

The local area may be a defined space or region other than an aircraft and the clients may be located within the defined space or region. For example, the local area may be defined by or within a building and the clients may be located in, around or adjacent to the building. The local area may be defined by or within one or more spaces or rooms of a building and the clients may be located in, around or adjacent to the one or more spaces or rooms. The local area may be defined by or within a vehicle of any kind and the clients may be located in or on the vehicle. The users may be passengers located in or on the vehicle.

One or more of the clients may be a personal computer (PC) or a computing device of any kind.

In some embodiments, rather than combining the content and DRM licence server functionality in a single content and DRM licence server 20*b*, 320*b*, 520*b* the content server functionality may be provided in a content server and the DRM licence server functionality may be provided in a DRM licence server which is physically separate from the content server.

Embodiments have been described above purely by way of example and it will be understood that details of the embodiments may be varied whilst still falling within the scope of the appended claims.

The invention claimed is:

1. A portable server for wirelessly distributing content to a plurality of clients in an aircraft, comprising:
 a memory or data store for storing content;
 a wireless content transceiver for wireless communication with one or more of the clients located within the aircraft for wireless distribution of at least some of the stored content from the portable server to one or more of the clients; and
 a wireless communication device which is configured to operate independently of the wireless content transceiver and which is configured to wirelessly receive information from one or more further wireless communication devices located within, and mounted to, the aircraft and
 a processing resource,
 wherein the wireless communication device is configured to receive and detect a signal from each of the one or more further wireless communication devices located within the aircraft, and the processing resource is configured to determine portable server location data from the one or more signals detected by the wireless communication device and to store the determined portable server location data in the memory or data store.

2. The portable server as claimed in claim 1, wherein the portable server location data comprises at least one of an identifier for the aircraft such as a unique aircraft number or aircraft code or an identifier for an airline with which the aircraft is associated such as a unique airline number or airline code.

3. The portable server as claimed in claim 2, wherein the portable server is configured to receive or monitor broadcast aircraft location information from the aircraft within which the portable server is located, and the processing resource is configured to use the aircraft identifier to distinguish between broadcast aircraft location information received from the aircraft within which the portable server is located and broadcast aircraft location information received from one or more other aircraft, to process the broadcast aircraft location information, and to generate, based on the processed broadcast aircraft location information, aircraft flight information for display on a moving map at the one or more clients.

4. The portable server as claimed in claim 3, wherein the broadcast aircraft location information comprises automatic dependent surveillance broadcast (ADSB) information.

5. The portable server as claimed in claim 1, wherein the portable server location data comprises an identifier for each of the one or more further wireless communication devices located within the aircraft such as a unique further wireless communication device number or code for each of the one or more further wireless communication devices located within the aircraft.

6. The portable server as claimed in claim 1, wherein at least one of the portable server location data comprises a transmitted Transmit Power (TxPwr) setting of each of the one or more further wireless communication devices located within the aircraft or the processing resource is configured to use the received signal strength (RSS) from each of the one or more further wireless communication devices located within the aircraft and the transmitted Transmit Power (TxPwr) setting of each of the one or more further wireless communication devices located within the aircraft to determine a distance of the portable server from each of the one or more further wireless communication devices located within the aircraft, to use the determined distance of the portable server from each of the one or more further wireless communication devices located within the aircraft and a known location of each of the one or more further wireless communication devices located within the aircraft to determine a location of the portable server within the aircraft, and to store the determined location of the portable server within the aircraft in the memory or data store.

7. The portable server as claimed in claim 1, wherein at least one of:
the wireless communication device is configured to wirelessly receive the information from each of the one or more further wireless communication devices located within, and mounted to, the aircraft at a data rate which is lower than a data rate at which the wireless content transceiver is configured to wirelessly distribute at least some of the stored content to one or more of the clients;
the wireless communication device is configured to consume less power than the wireless content transceiver;
the wireless communication device and the wireless content transceiver are configured to use different wireless communication standards or protocols;

the wireless communication device is configured to use a Bluetooth wireless communication standard or protocol, wherein the wireless communication device comprises a Bluetooth receiver and each of the one or more further wireless communication devices comprises a Bluetooth transmitter; or
the wireless communication device is configured to use a RFID wireless communication standard or protocol, wherein the wireless communication device comprises an RFID reader or scanner and each of the one or more further wireless communication devices comprises an RFID tag.

8. The portable server as claimed in claim 1, wherein the wireless communication device of the portable server is configured to repeatedly at least one of monitor or scan for transmissions from each of the one or more further wireless communication devices located within the aircraft or to repeatedly at least one of monitor or scan for each of the one or more further wireless communication devices located within the aircraft.

9. The portable server as claimed in claim 1, wherein the wireless communication device of the portable server is configured to broadcast information wirelessly to one or more wireless communication devices of one or more other portable servers located within the aircraft to thereby advertise the presence of the portable server to the one or more other portable servers located within the aircraft, wherein the wireless communication device of the portable server is configured to receive information wirelessly from one or more wireless communication devices of one or more other portable servers located within the aircraft, and the processing resource is configured to determine the number of other portable servers located within the aircraft from the information received wirelessly from the one or more wireless communication devices of the one or more other portable servers located within the aircraft, to compare the determined number of other portable servers located within the aircraft with a known or expected number of other portable servers located within the aircraft, and at least one of to emit a warning indication or signal or to record a warning message, if the number of other portable servers located within the aircraft determined from the information received wirelessly from the one or more wireless communication devices of the one or more other portable servers located within the aircraft does not match the known or expected number of other portable servers located within the aircraft.

10. A portable server system for wirelessly distributing content to a plurality of clients in an aircraft, the portable server system comprising:
the portable server as claimed in claim 1; and
the one or more further wireless communication devices located within, and mounted to, the aircraft.

11. A portable server system for wirelessly distributing content to a plurality of clients in an aircraft, the portable server system comprising:
a plurality of portable servers, wherein each portable server is configured as claimed in claim 1; and
a plurality of further wireless communication devices located within, and mounted to, the aircraft, each further wireless communication device being associated with a corresponding one of the portable servers,
wherein the wireless communication device of each portable server is configured to operate independently of the wireless content transceiver of the same portable server and is configured to wirelessly receive information from each of the one or more further wireless communication devices located within, and mounted to, the aircraft.

12. A method for wirelessly distributing content to a plurality of clients in an aircraft, the method comprising:

wirelessly communicating content stored in a memory or data store of a portable server from a wireless content transceiver of the portable server to one or more of the clients within the aircraft;

wirelessly communicating information from one or more further wireless communication devices located within, and mounted to, the aircraft to a wireless communication device of the portable server, wherein the wireless communication device is configured to operate independently of the wireless content transceiver, and wherein wirelessly communicating the information from the one or more further wireless communication devices located within, and mounted to, the aircraft to the wireless communication device of the portable server comprises receiving and detecting a signal at the wireless communication device from each of the one or more further wireless communication devices located within the aircraft determining portable server location data from the one or more signals detected by the wireless communication device; and storing the determined portable server location data in the memory or data.

13. A portable server for wirelessly distributing content to a plurality of clients in an aircraft, comprising:

a memory or data store for storing content;

a wireless content transceiver for wireless communication with one or more of the clients located within the aircraft for wireless distribution of at least some of the stored content from the portable server to one or more of the clients;

a wireless communication device which is configured to operate independently of the wireless content transceiver and which is configured to wirelessly receive information from one or more further wireless communication devices located within, and mounted to, the aircraft, and wherein the wireless communication device of the portable server is configured to repeatedly at least one of monitor or scan for transmissions from each of the one or more further wireless communication devices located within the aircraft or to repeatedly at least one of monitor or scan for each of the one or more further wireless communication devices located within the aircraft.

14. A method for wirelessly distributing content to a plurality of clients in an aircraft, the method comprising:

wirelessly communicating content stored in a memory or data store of a portable server from a wireless content transceiver of the portable server to one or more of the clients within the aircraft;

wirelessly communicating information from one or more further wireless communication devices located within, and mounted to, the aircraft to a wireless communication device of the portable server, wherein the wireless communication device is configured to operate independently of the wireless content transceiver, and wherein the method further comprises:

the wireless communication device of the portable server repeatedly at least one of monitoring or scanning for transmissions from each of the one or more further wireless communication devices located within the aircraft or repeatedly at least one of monitoring or scanning for each of the one or more further wireless communication devices located within the aircraft.

* * * * *